(12) United States Patent
El-Gawady et al.

(10) Patent No.: US 11,277,450 B2
(45) Date of Patent: Mar. 15, 2022

(54) OVER-THE-TOP CLIENT WITH NATIVE CALLING QUALITY OF SERVICE

(71) Applicant: Verizon Patent and Licensing Inc., Arlington, VA (US)

(72) Inventors: Sameh El-Gawady, Waltham, MA (US); Richard Phipps, Waltham, MA (US); Andrew Wahlon Lam, River Edge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 162 days.

(21) Appl. No.: 16/266,238

(22) Filed: Feb. 4, 2019

(65) Prior Publication Data
US 2020/0252440 A1 Aug. 6, 2020

(51) Int. Cl.
| | |
|---|---|
| *H04L 29/06* | (2006.01) |
| *H04L 65/10* | (2022.01) |
| *H04L 65/1073* | (2022.01) |
| *H04L 65/80* | (2022.01) |
| *H04L 65/1069* | (2022.01) |
| *H04L 65/1016* | (2022.01) |

(52) U.S. Cl.
CPC ...... *H04L 65/1006* (2013.01); *H04L 65/1016* (2013.01); *H04L 65/1069* (2013.01); *H04L 65/1073* (2013.01); *H04L 65/80* (2013.01)

(58) Field of Classification Search
CPC ............. H04L 65/1006; H04L 65/1016; H04L 65/1059; H04L 65/1073; H04L 65/80; H04W 80/10
See application file for complete search history.

(56) References Cited

U.S. PATENT DOCUMENTS

| | | | | |
|---|---|---|---|---|
| 9,867,098 | B2 * | 1/2018 | Kwok | H04W 36/14 |
| 10,091,319 | B1 * | 10/2018 | Cham | H04L 67/2823 |
| 2013/0339531 | A1 * | 12/2013 | Mohanraj | H04L 65/1069 709/227 |
| 2016/0119468 | A1 * | 4/2016 | Efrati | H04L 67/26 370/431 |
| 2016/0150574 | A1 * | 5/2016 | Edge | H04W 4/029 455/404.2 |
| 2016/0212192 | A1 * | 7/2016 | Chavez | H04L 65/1069 |
| 2016/0219024 | A1 * | 7/2016 | Verzun | H04L 63/0464 |
| 2016/0227386 | A1 * | 8/2016 | Shaltiel | H04W 4/16 |
| 2017/0034358 | A1 * | 2/2017 | Bianco | H04L 65/1069 |
| 2018/0014168 | A1 * | 1/2018 | Lau | H04W 4/14 |
| 2018/0049095 | A1 * | 2/2018 | Mishra | H04W 4/18 |
| 2018/0198830 | A1 * | 7/2018 | Wallis | H04L 65/1006 |
| 2018/0198920 | A1 * | 7/2018 | Kahn | H04L 65/1073 |

(Continued)

*Primary Examiner* — Ario Etienne
*Assistant Examiner* — Kidest Mendaye

(57) ABSTRACT

A method, a device, and a non-transitory storage medium are described in which a native-based support service for an over-the-top application is provided. A network device provides a registration procedure that enables a linking between an identity of the over-the-top application and an identity of a native application for a communication service, and enables a quality of service to be provisioned afforded to the native application for the over-the-top application. The network device provisions originating and terminating communication sessions of the communication service having the native quality of service in relation to the identity of the over-the-top application.

20 Claims, 18 Drawing Sheets

(56) References Cited

U.S. PATENT DOCUMENTS

2018/0279128 A1* 9/2018 Zaifuddin ............. H04L 65/403
2018/0288228 A1* 10/2018 Frazier ................ H04L 65/1069
2019/0059024 A1* 2/2019 Mufti .................. H04L 65/1016

* cited by examiner

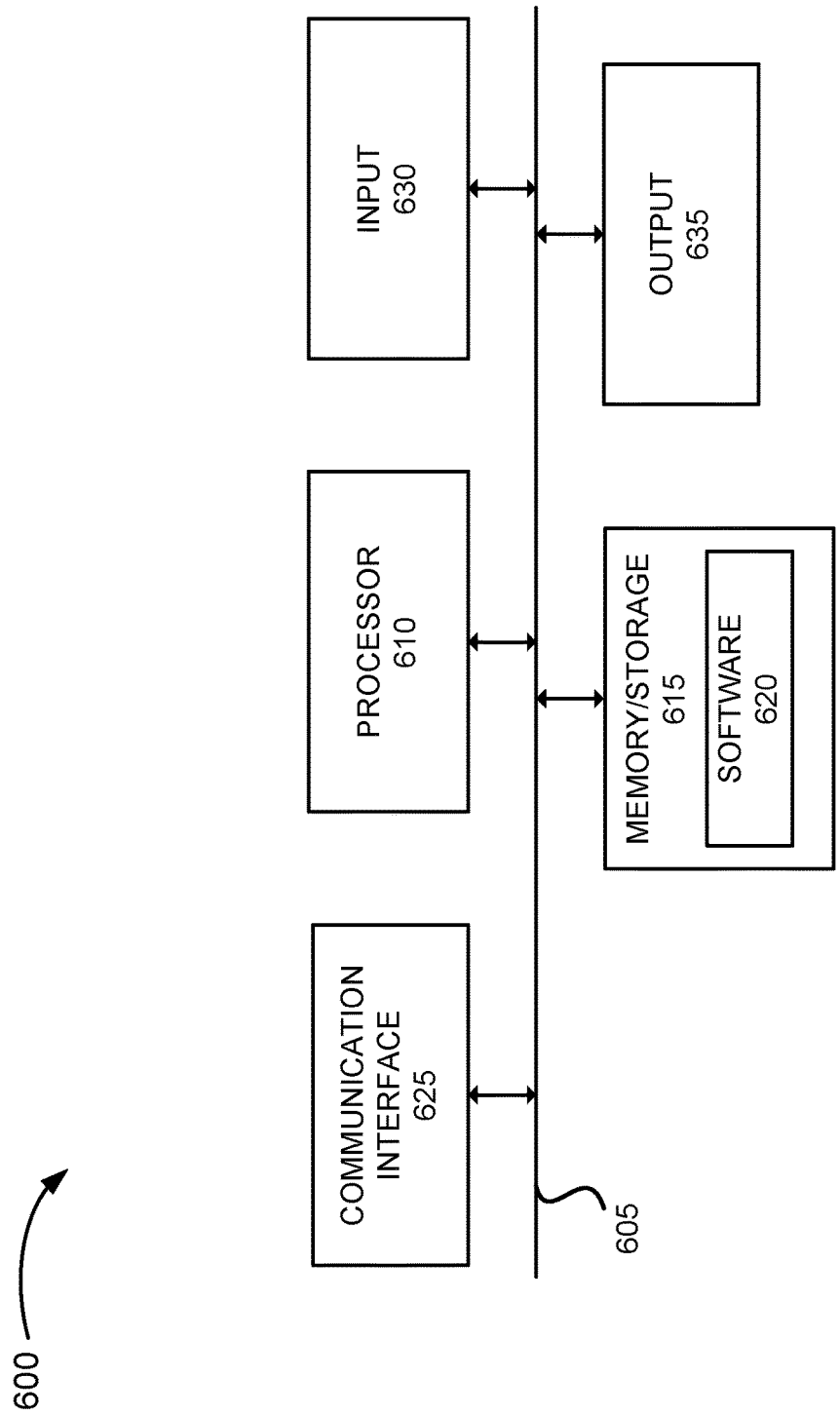

US 11,277,450 B2

OVER-THE-TOP CLIENT WITH NATIVE CALLING QUALITY OF SERVICE

BACKGROUND

Ubiquitous communication and information exchange offer users numerous advantages. There are a variety of end devices available to users, such as smartphones, tablets, netbooks, phablets, wearable devices, computers (e.g., laptops, desktops, etc.), and other types of user devices. These types of end devices, as well as other types, provide users with various applications and services, such as media services, communication services (e.g., telephone, video conferencing, messaging, etc.), navigation services, web browsing, business-related services, and other types of services and applications.

BRIEF DESCRIPTION OF THE DRAWINGS

FIG. 6 is a diagram illustrating exemplary components of a device that may correspond to one or more of the devices illustrated and described herein.

DETAILED DESCRIPTION OF PREFERRED EMBODIMENTS

Figure 1A:
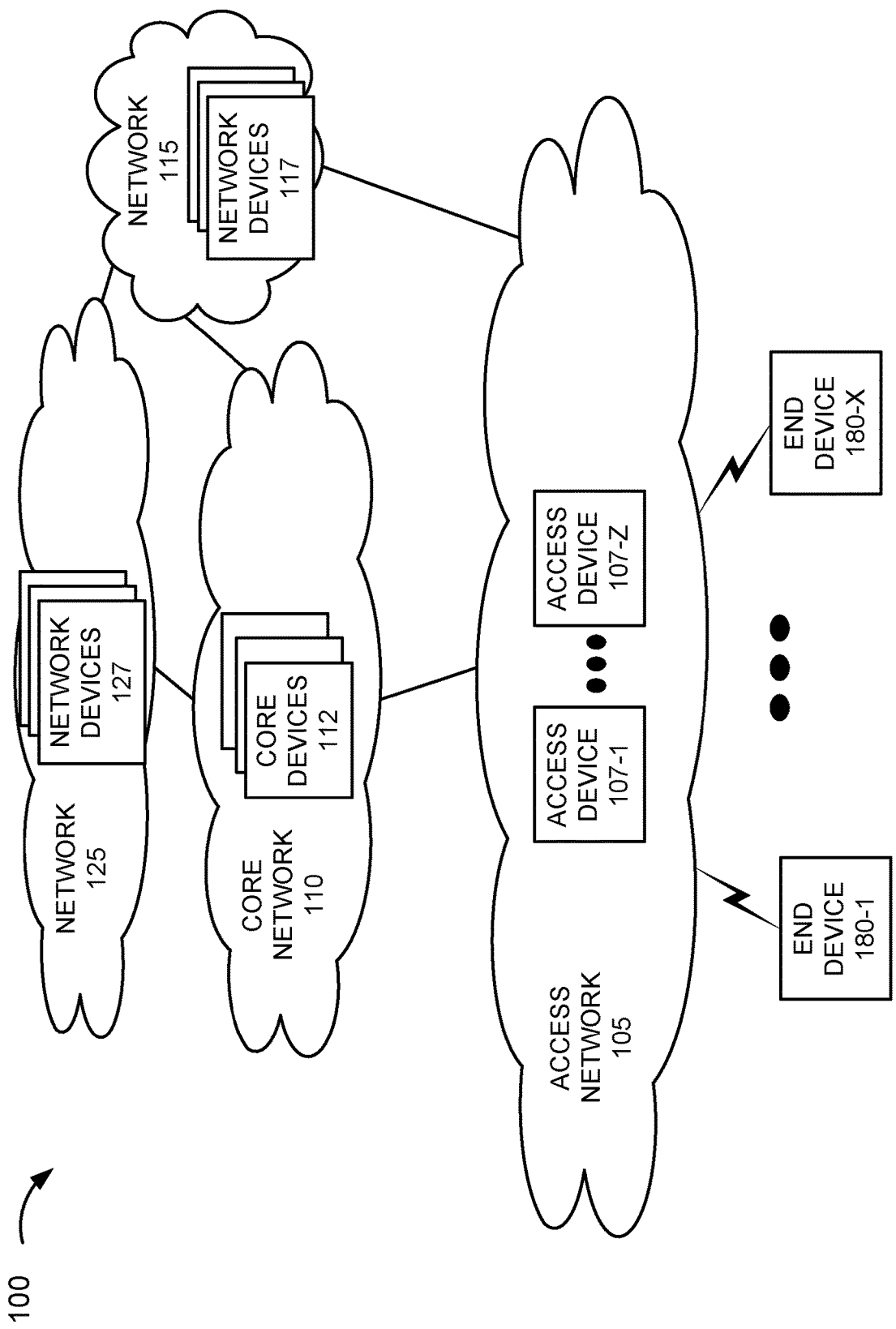
FIG. 1A is a diagram illustrating an exemplary environment in which an exemplary embodiment of a native-based support service for an over-the-top (OTT) application may be implemented.

The following detailed description refers to the accompanying drawings. The same reference numbers in different drawings may identify the same or similar elements. Also, the following detailed description does not limit the invention.

Various types of end devices provide users with numerous ways for communicating with each other, such as voice, text, and audio/video communication. Some end devices may use an over-the-top (OTT) application to transmit or receive a communication, such as a telephone call, while other end devices, such as a smartphone, may include an integrated native or embedded application (e.g., uses/part of a native dialer). Unfortunately, the end device that uses the OTT application to provide a telephone service does not provide the same quality-of-service (QoS), when using Internet access, as the end device that uses the embedded application. For example, the telephone service afforded by the embedded application may be supported by an infrastructure (e.g., a Voice over Long Term Evolution (VoLTE) network, an Internet Protocol Multimedia Subsystem (IMS) network, a mobile or multi-access edge computing (MEC) network, a fog network, a Voice over New Radio (VoNR) network, or another type of non-OTT network-side infrastructure (e.g., circuit-switched telephony, wired PSTN) that provides various types of quality-of-service enhancements (e.g., prioritization, traffic management, dedicated bearer, low latency, IMS authentication, guaranteed bit rate (GBR), etc.) relative to an OTT infrastructure (e.g., an Internet-based best effort infrastructure) that supports the OTT application.

According to exemplary embodiments, a native-based support service for an OTT application is provided. According to an exemplary embodiment, from an end device perspective, the OTT application of the end device cooperatively provisions a communication service with an integrated native application of the end device. According to an exemplary embodiment, the OTT application may register with a network of the integrated native application (e.g., an IMS network, a VoLTE network, or another type of network that supports the communication service) in which, as part of a registration message, the OTT application indicates that an identity of the OTT application (e.g., a telephone number or other type of address) is linked or associated with an identity of the integrated native application of the end device, as described herein. According to other exemplary embodiments, the OTT application may register with its own network, which may or may not be the same as the network of the integrated native application. According to an exemplary embodiment, the communication service provides for a shared identity. For example, in the context of a telephone service, the shared identity may be used by the OTT application.

According to an exemplary embodiment, from the network-side perspective, the network links or associates the identity of the OTT application with the identity of the integrated native application. According to an exemplary embodiment, based on the linking or association, the network will provide the communication service with the support of the infrastructure afforded by the integrated native application and its corresponding quality-of-service, as described herein.

According to various exemplary embodiments, the OTT application, the integrated native application, and the network may include logic that uses Session Initiation Protocol (SIP)-based messaging for mobile originating (MO) and mobile terminating (MT) procedures in support of the native-based support service and the communication service, as described herein. According to other exemplary embodiments, a signaling protocol other than SIP may be used (e.g., H.323, a future generation signaling protocol for a communication session, etc.).

As a result of the foregoing, the native-based support service improves the quality of service of a communication service during a communication session relative to the quality of service afforded by an OTT architecture or service. Additionally, in contrast to other possible approaches that may include the use of a new network element and interface in the network, a new channel (e.g., an additional out-of-band (OOB) communication channel, etc.), the addition or use of a pool of hidden identities, and/or other types of added infrastructure elements that not only require the provisioning of these additional network resources, but also add to the total utilization of network resources when providing the communication service.

FIG. 1A is a diagram illustrating an exemplary environment 100 in which an exemplary embodiment of a native-based support service for an OTT application may be implemented. As illustrated, environment 100 includes an access network 105, a network 115, a core network 110, and a network 125. Access network 105 includes access nodes 107-1 through access nodes 107-Z (also referred to collectively as access nodes 107 and, individually or generally as access device 107). Core network 110 includes core network devices 112. Network 115 includes network devices 117, and network 125 includes network devices 127. Environment 100 further includes end devices 180-1 through 180-X (also referred to collectively as end devices 180 and, individually or generally as end device 180).

According to other embodiments, environment 100 may include additional devices, fewer devices, and/or different types of devices than those illustrated and described herein. For example, a function of a single network device may be implemented by multiple devices, and/or functions of multiple network devices may be implemented by a single network device. In this regard, the number, type, and/or arrangement of network devices (also known as network elements or network functions) in environment 100, as illustrated and described, are exemplary.

A network device, a network element, or a network function (referred to herein simply as a network device) may be implemented according to one or multiple network architectures (e.g., a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture. The number and type of end devices 180 are also exemplary. Additionally, the number, the type, and the arrangement of networks in environment 100, as illustrated and described, are exemplary.

Environment 100 includes communication links between network devices, between networks, and between end device 180 and network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1A. A direct communicative connection may not involve an intermediary device and/or an intermediary network. The number and the arrangement of communication links illustrated in environment 100 are exemplary.

Environment 100 may include various planes of communication including, for example, a control plane, a user plane, and a network management plane. Environment 100 may include other types of planes of communication. A message communicated in support of the native-based support service for an OTT application may use at least one of these planes of communication. According to various exemplary implementations, an interface of a network device may be a service-based interface or a reference point-based interface.

Access network 105 may include one or multiple networks of one or multiple network types and technologies. For example, access network 105 may include a Fourth Generation (4G) radio access network (RAN), a 4.5G RAN, a Fifth Generation (5G) RAN, and/or another type of future generation RAN. By way of further example, access network 105 may be implemented to include an Evolved UMTS Terrestrial Radio Access Network (E-UTRAN) of a Long Term Evolution (LTE) network, an LTE-Advanced (LTE-A) network, an LTE-A Pro network, and/or a next generation (NG) RAN. Access network 105 may further include other types of wireless networks, such as a WiFi network, a Worldwide Interoperability for Microwave Access (WiMAX) network, a local area network (LAN), or another type of network that may provide an on-ramp to another network.

According to various exemplary embodiments, access network 105 may be implemented to include various architectures of wireless service, such as, for example, macrocell, microcell, femtocell, picocell, metrocell, new radio (NR) cell, LTE cell, non-cell, or another type of cell architecture. Additionally, according to various exemplary embodiments, access network 105 may be implemented according to various wireless technologies (e.g., radio access technology (RAT), etc.), wireless standards, wireless frequencies, bands, and carriers. Additionally, access network 105 may include different and multiple functional splitting, such as options 1, 2, 3, 4, 5, 6, 7, or 8, plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), carrier aggregation (CA), network slicing, coordinated multipoint (CoMP), and/or another type of connectivity service.

Depending on the implementation, access network 105 may include one or multiple types of access devices 107. For example, access devices 107 may be implemented to include an evolved Node B (eNB), a next generation Node B (gNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.)), or another type of wireless node (e.g., a WiFi device, a WiMax device, a hot spot device, etc.) that provides a wireless access service.

Core network 110 may include one or multiple networks of one or multiple network types and technologies. Core network 110 may include a complementary network pertaining to access network 105. For example, core network 110 may include network devices of an Evolved Packet Core (EPC) of an LTE network (e.g., LTE, LTE-A, LTE-A Pro) a next generation core network (NGC). Depending on the implementation, core network 110 may include various types of core devices 112. By way of further example, core devices 112 may include a mobility management entity (MME), a user plane function (UPF), a packet data network gateway (PGW), a serving gateway (SGW), a session management function (SMF), an access and mobility management function (AMF), a policy and charging rules function (PCRF), a charging system (CS), a unified data management (UDM) device, an authentication server function (AUSF), a network slice selection function (NSSF), a network repository function (NRF), a policy control function (PCF), and so forth, as well other network devices pertaining to various network-related functions that facilitate the operation of core network 110.

Network 115 includes one or multiple networks of one or multiple types and technologies. For example, network 115 may include an Internet Protocol Multimedia Subsystem (IMS) network, a Rich Communication Service (RCS) network, a cloud network, a MEC network, a fog network, a VoLTE network, or another type of network that supports the communication service and may not be provisioned in an OTT manner. According to an exemplary embodiment, network 115 includes a network that provides the native-based support service for an OTT application, as described herein. For example, one or multiple network devices 117 may include logic that provides the native-based support service for an OTT application. According to an exemplary embodiment, network 115 includes a network that provides a communication service to end device 180. According to an exemplary implementation, the communication service may be a telephone service. According to other exemplary implementations, the communication service may be another type of end user or real-time service, such as an audio and video communication service, a messaging service, a location service, a presence service, a push-to-talk service, or another service (e.g., a sharing service (e.g., document/whiteboard, etc.)).

Depending on the implementation, network 115 may include various types of network devices 117. For example, network devices 117 may include a Serving Call State Control Function (S-CSCF), a Proxy-CSCF (P-CSCF), an Interrogating-CSCF (I-CSCF), various types of application servers (ASs) and/or media servers, a gateway (e.g., Session Border Control (SBC), etc.), a virtualized network function (VNF), a virtualized infrastructure manager (VIM), an operations support system (OSS), a local domain name server (DNS), a virtual network function manager (VNFM), an authentication device, an authorization device, and/or other types of network devices and network resources (e.g., storage devices, communication links, etc.) that provide for the provisioning of the communication service.

Network 125 includes one or multiple networks of one or multiple types and technologies. For example, network 125 may be implemented to include a service or an application-layer network, the Internet, the World Wide Web (WWW), a cloud network, or another type of network that hosts an end device application or service, which includes a communication service. According to an exemplary embodiment, network 125 includes a network that provides the communication service in an OTT manner. Depending on the implementation, network 125 may include various types of network devices 127 that provide various applications, services, or other type of end device assets, such as servers (e.g., web, application, cloud, etc.), mass storage devices, data center devices, and/or other types of network devices pertaining to various network-related functions (e.g., security, authentication, authorization, billing, etc.).

End device 180 includes a device that has computational and wireless communication capabilities. End device 180 may be implemented as a mobile device, a portable device, or a stationary device. For example, end device 180 may be implemented as a smartphone, a personal digital assistant, a tablet, a netbook, a phablet, a wearable device, or some other type of wireless user device. According to various exemplary embodiments, end device 180 may be configured to execute various types of software (e.g., applications, programs, etc.). The number and the types of software may vary among end devices 180.

According to an exemplary embodiment, end device 180 may include logic that provides the native-based support service for an OTT application. Referring to FIG. 1B, according to an exemplary embodiment, end device 180-1 may include a native application 185 and an OTT application 190. According to an exemplary embodiment, native application 185 and OTT application 190 may each include logic that provides the native-based support service, as described herein. According to an exemplary embodiment, native application 185 and OTT application 190 may each include logic that provides for a same type of communication service (e.g., a telephone service, an audio/video communication service, etc.).

Figure 1C:
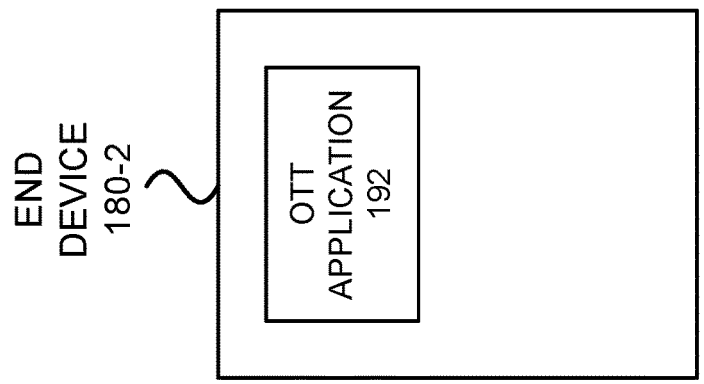
FIGS. 1B and 1C are diagrams illustrating exemplary embodiments of an end device depicted in FIG. 1A.
Figure 1B:
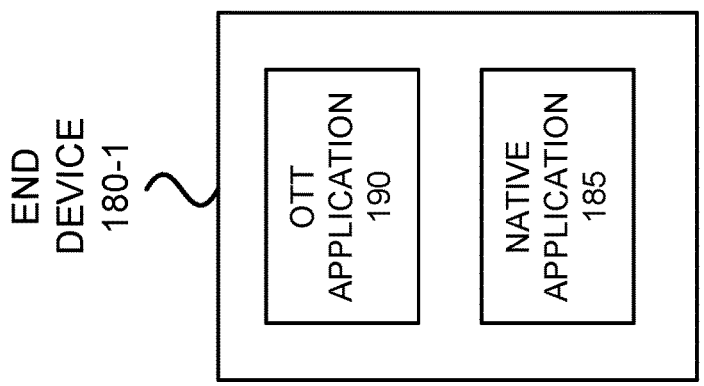
Figure 1D:
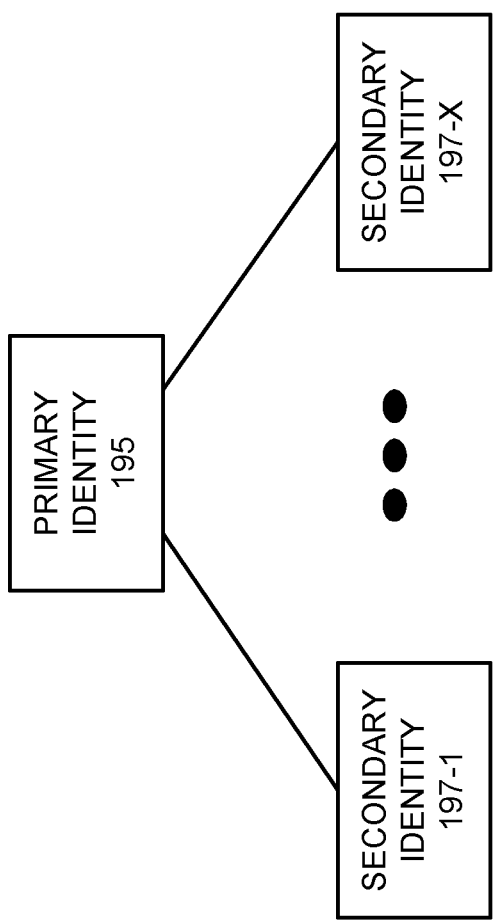
FIG. 1D is a diagram illustrating an exemplary framework for an exemplary shared communication service.

Referring to FIGS. 1B, 1C, and 1D, a communication service, such as a telephone service, may provide for a linking between a primary identity 195 (e.g., a primary telephone number or another type of identity) and one or multiple secondary identities 197-1 through 197-X (e.g., one or multiple virtual telephone numbers or another type of identity). Native application 185 may use the primary identity 195 for the communication service, and be supported by an infrastructure (e.g., a network) that provides various types of quality of service enhancements not provided by an OTT infrastructure. According to such an exemplary communication service, native application 185 may include a native dialer that is used for providing the telephone service. For example, end device 180-1 of FIG. 1B may be implemented as a smartphone or another type of user device that includes a native and integrated telephone (e.g., an end device 180 that uses a Subscriber Identity Module (SIM) card, an embedded SIM (eSIM), a Universal Integrated Circuit Card (UICC), an embedded UICC, etc.).

According to an exemplary embodiment, OTT application 190 may include logic to establish an association with an identity of the communication service associated with native application 185, and the infrastructure (e.g., a network) that provides various types of quality of service enhancements not provided by an OTT infrastructure. For example, according to an exemplary communication service, the native-based support service may allow OTT application 190 to use primary identity 195 in relation to the telephone service, as described herein. According to this framework, primary identity 195 may be shared by, for example, the same user on multiple end devices 180, or among multiple users on multiple end devices 180.

Referring to FIG. 1C, according to another example of end device 180, an OTT application 192 may be resident on a type of end device 180-2 that does not include native application 185 of the communication service. For example, end device 180-2 of FIG. 1C may be a tablet, a personal computer, or another type of device that does not include a native dialer, an end device 180 that does not use a SIM card, etc. According to this example, end device 180 may be linked to primary number 195.

Figure 2:
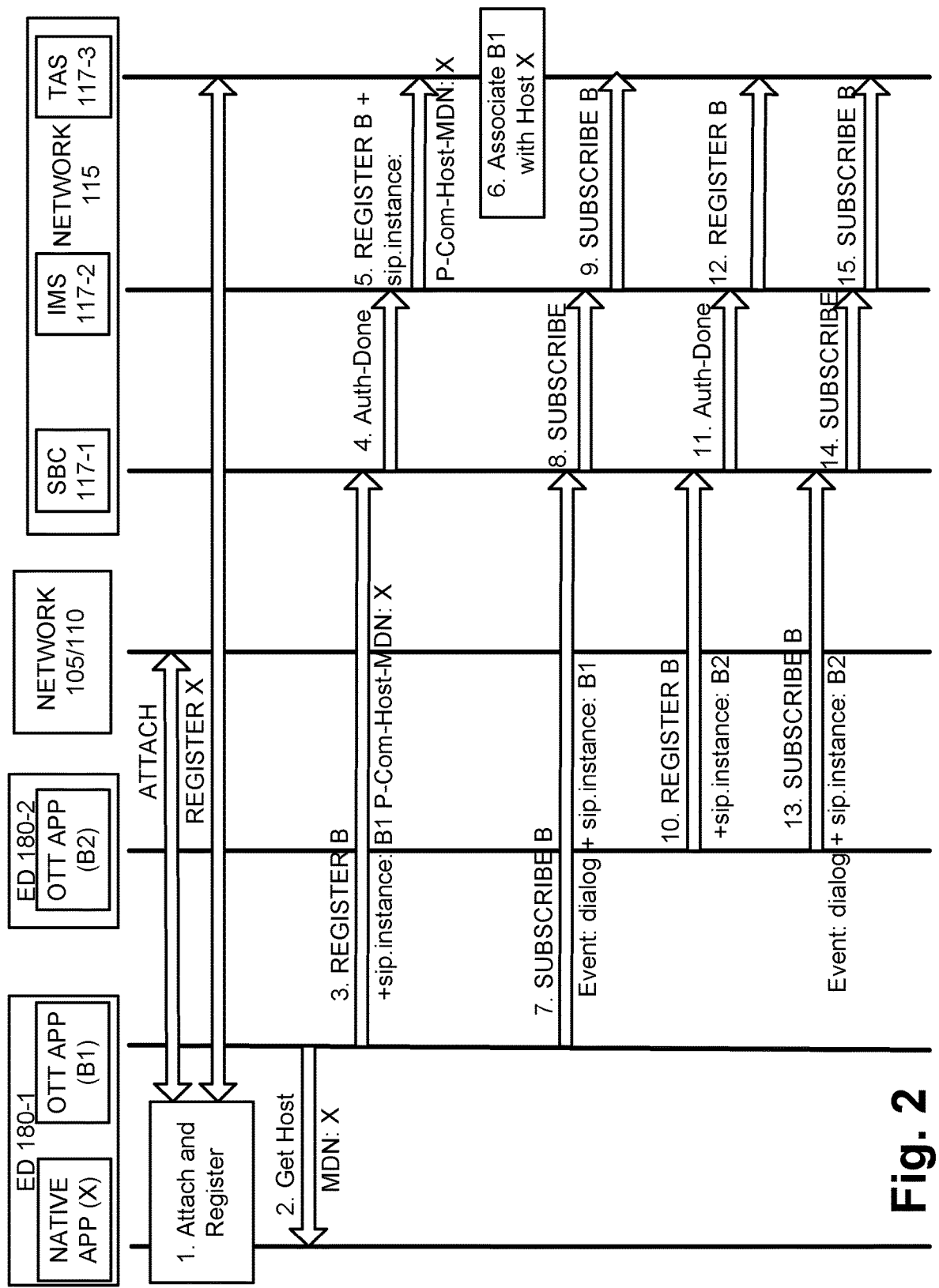
FIG. 2 is a call flow diagram illustrating an exemplary process of an exemplary embodiment of the native-based support service for the OTT application.

FIG. 2 is a call flow diagram illustrating an exemplary process of an exemplary embodiment of the native-based support service for the OTT application. For example, the call flow diagram may provide for a process to register and subscribe to a communication service. According to an exemplary embodiment, the registration and subscription process may use SIP-based messaging. While the process of FIG. 2 may refer to a telephone service, according to other exemplary embodiments, the registration and subscription may pertain to communication service different from a telephone service. Additionally, the number and type of networks are exemplary.

Referring to FIG. 2, in step (1), end device 180-1 may attach and establish a bearer with access network 105 and core network 110 (network 105/110). Additionally, a native application (X) of end device 180-1 may register with network devices 117 of network 115 (e.g., IMS devices 117-2 via SBC 117-1). For purposes of description, assume the native application has an identity (X), which is a primary identity (e.g., a telephone number, etc) that is shared and/or linked with the OTT applications of end device 180-1 and end device 180-2. Also assume, for purposes of description, that the OTT application of end device 180-1 has an identity of B (e.g., a virtual telephone number; a public shared telephone number) and a private identity (e.g., B1) to distinguish itself from other end devices 180 (e.g., end device 180-2), and the OTT application of end device 180-2 has the identity of B (e.g., the same virtual telephone number; the same public shared telephone number) and a private identity (e.g., B2). According to an exemplary embodiment, the private identity may be an identifier of the subscription of the communication service. For example, the private identity may be an International Mobile Subscriber Identity (IMSI), an International Mobile Equipment Identity (IMEI), a unique device identifier (UDID), or other unique identifier that may be generated by the OTT application.

In step (2), OTT application (B1) may initialize through the operating system (OS) of end device 180-1 or another device process, and obtain the primary identity (e.g., a telephone number etc.) and the service associated with the primary identity (e.g., VoLTE, etc.). In step (3), OTT application (B1) generates and transmits a SIP REGISTER message to network 115 so as to register the B identity. Additionally, the SIP REGISTER message includes data indicating that the B identity should be afforded the QoS of identity X. For example, according to an exemplary implementation, the SIP REGISTER message may include a parameter (e.g., +sip.instance) and a parameter value (B1), and another parameter (e.g., P-COM-Host-MDN), and a parameter value (e.g., X) to indicate a link between the OTT application B1 and X identity, and the corresponding QoS for provisioning the communication service. In this way, for example, an (indirect) link between the B identity to the X identity may be made based on the private identifier (B1) (e.g., B→B1→X). According to other exemplary implementations, the format and syntax of the parameter value may be different.

As further illustrated, in step (4), network device 117 of network 115 (e.g., SBC 117-1) may optionally authenticate/authorize the registration, and in step (5), network device 117 (e.g., telephone application server (TAS) 117-3) may receive the SIP REGISTER message. In step (6), TAS 117-3 may associate the OTT application B1 with the X identity. For example, TAS 117-3 may store data that indicates a correlation between the X and B1 identities.

According to this exemplary scenario, native application (X) and OTT application (B1) may register with the same network 115. According to other exemplary scenarios, native application (X) and OTT application (B1) may register with different networks 115. According to such an exemplary scenario, there may be inter-networking between networks 115 (e.g., between IMS networks of different carriers, etc.).

In steps (7)-(9), OTT application (B1) may subscribe to TAS 117-3 in order to be notified of the communication status for identity B. Additionally, for the sake of description, steps (10)-(15) illustrate exemplary operations and messaging that may be performed by OTT application (B2) to register and subscribe. As illustrated, assume that end device 180-2 does not include a native application. In this regard, the SIP REGISTER message is different from that described in relation to the SIP REGISTER message of OTT application (B1).

Although FIG. 2 illustrates an exemplary process of the native-based support service for the OTT application, according to other exemplary embodiments, the process may include additional, different, and/or fewer steps. For example, the native application (X) and/or the OTT application (B2) may not register with network 115. Additionally, for example, OTT application (B1) may make one or multiple determinations before performing step (2). According to an exemplary implementation, OTT application (B1) may determine whether the native-based support service is permitted. For example, there may be a user preference that indicates whether the native-based support service is enabled or disabled. Additionally, or alternatively, OTT application (B1) may or may not invoke the native-based support service depending on whether cellular wireless service is available (e.g., versus WiFi, etc.) and/or other context information (e.g., airplane mode enabled, poor wireless coverage, etc.). Also, the exemplary process may include the transmission and reception of messages (e.g., SIP 200 OK message, other types of response messages, request messages, etc.) that have been omitted for the sake of brevity.

Figure 3A:
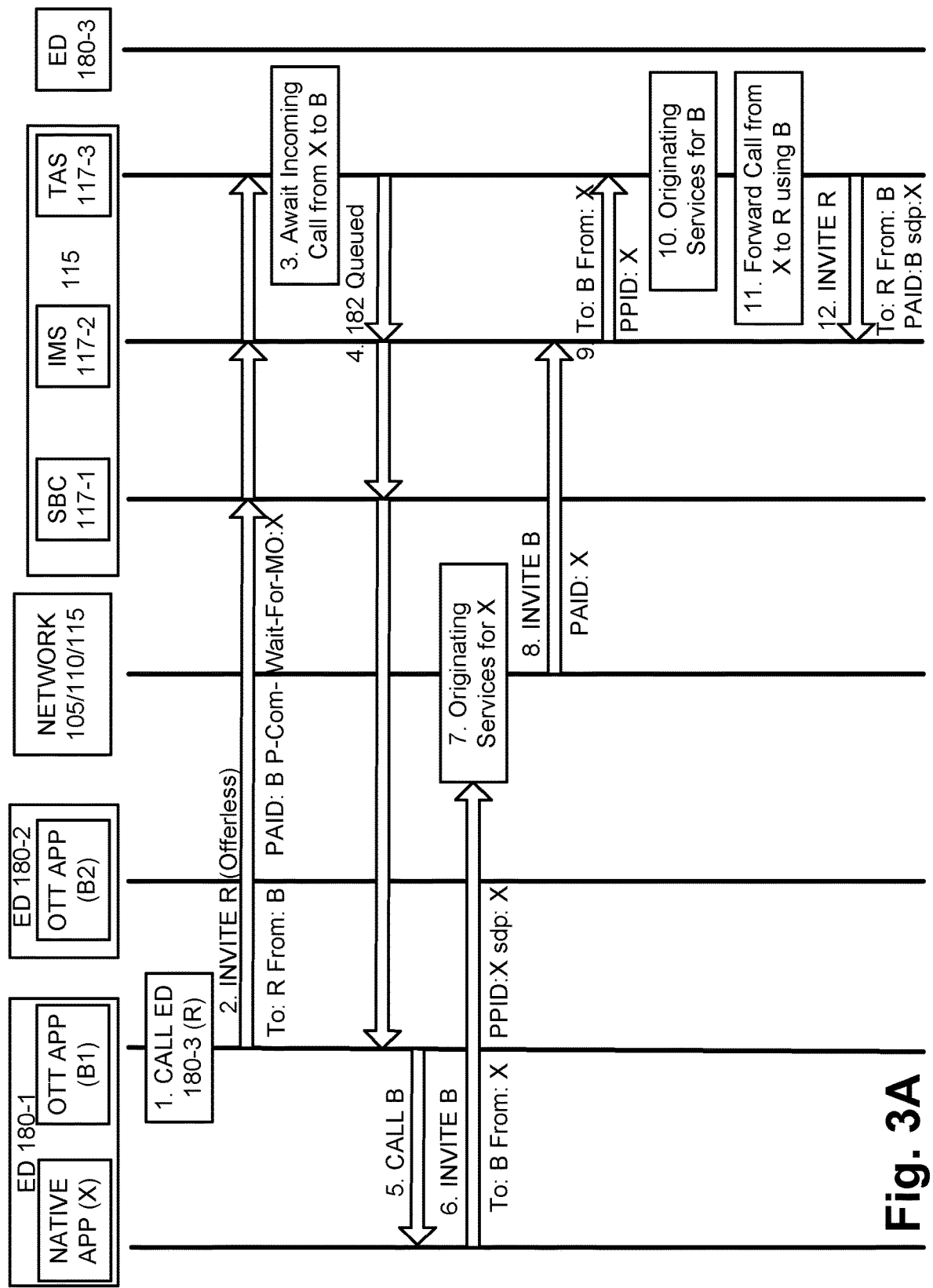
FIGS. 3A-3C are call diagrams illustrating another exemplary process of an exemplary embodiment of the native-based support service for the OTT application.
Figure 3B:
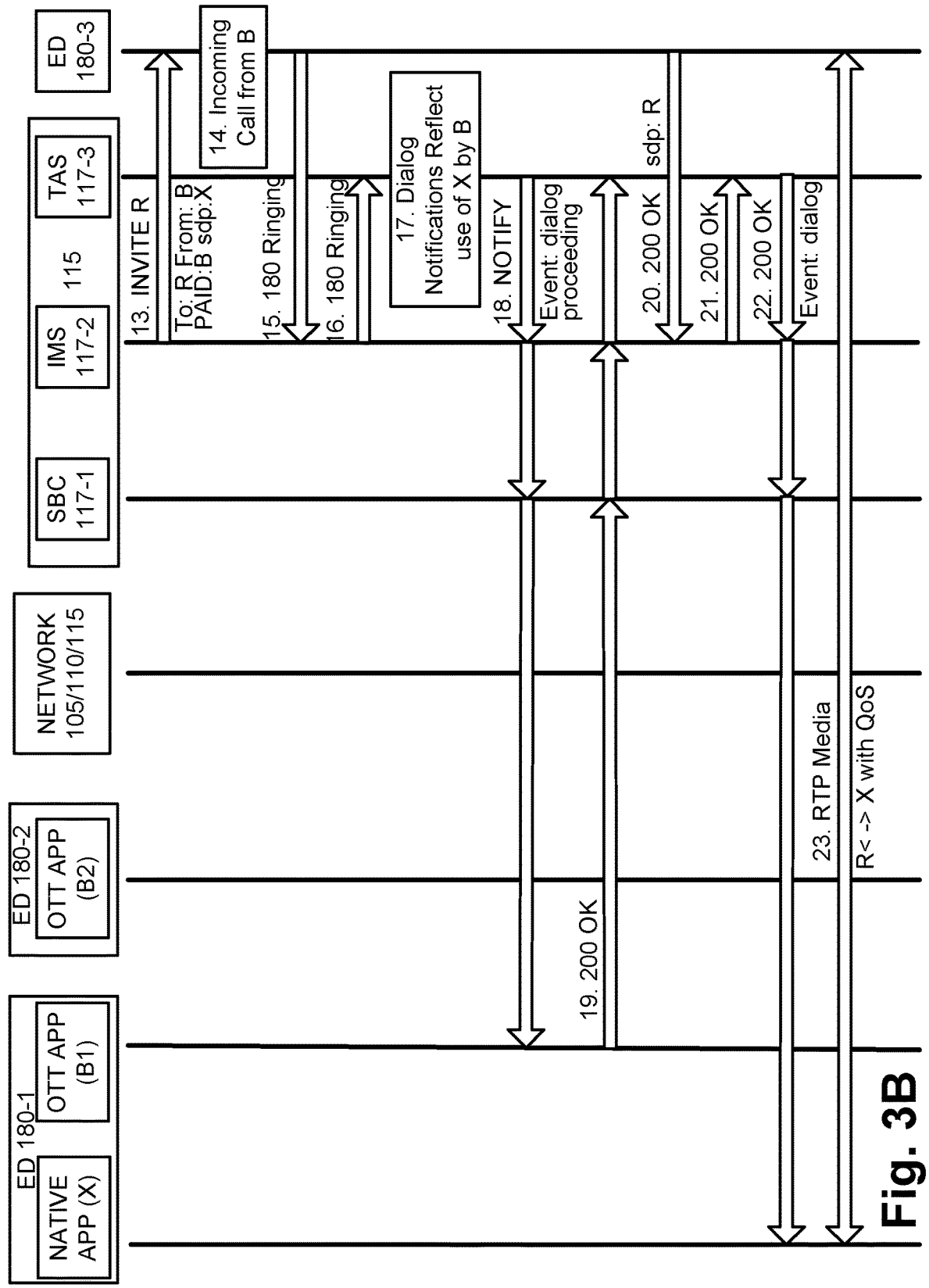
Figure 3C:
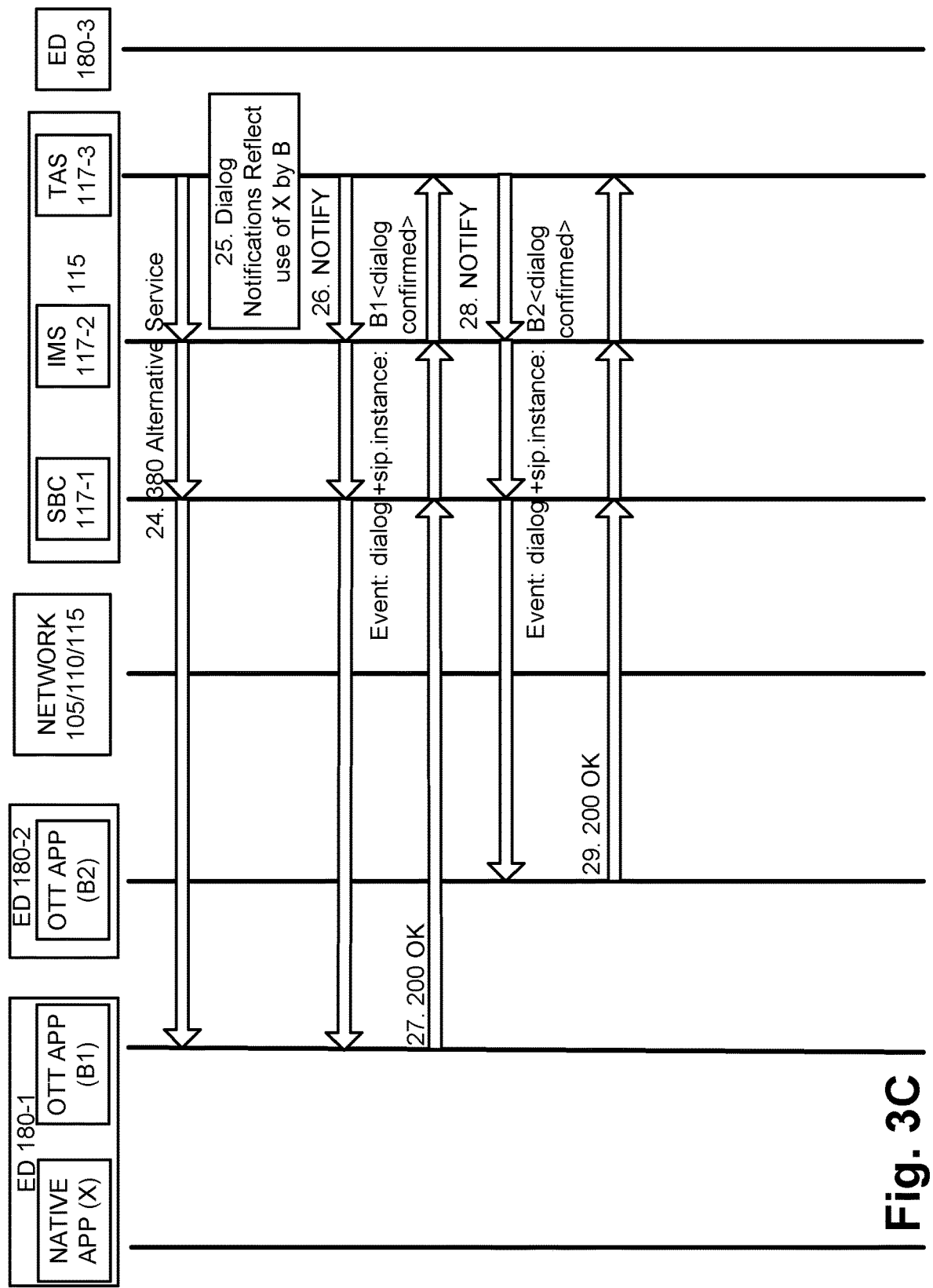

FIGS. 3A-3C are call flow diagrams illustrating another exemplary process of an exemplary embodiment of the native-based support service for the OTT application. For example, the call flow diagram may provide for a process to initiate a communication session from OTT application (B1) to end device 180-3 (e.g., a mobile originating (MO) call flow). According to an exemplary embodiment, the mobile originating call process may use SIP-based messaging. Additionally, while the process of FIGS. 3A-3C may refer to a telephone service, according to other exemplary embodiments, the mobile originating call process may pertain to communication service different from a telephone service. The number and type of networks are exemplary. It may be assumed that OTT application (B1) and native application (X) are registered and subscribed with a network 115.

Referring to FIG. 3A, in step (1), a user may initiate a telephone call to end device 180-3. For purposes of description, assume that end device 180 has an identity (R). In step (2), OTT application (B1) generates and transmits a SIP Offerless INVITE message to TAS 117-3 of network 115. Additionally, the SIP Offerless INVITE message includes a P-Asserted-Identity header (PAID) for the identity (e.g., public identity (B)) of the OTT application (B1) and data indicating to TAS 117-3 to wait for an incoming call from the native application (X). According to an exemplary implementation, as illustrated, the data may include the parameter and parameter value: P-Com-Wait-For-MO: X. According to another exemplary implementation, the data may use a different format and/or syntax. In step (3), in response to receiving the SIP Offerless Invite message, TAS 117-3 may wait for an incoming call from identity X to identity B1, and in step (4), generate and transmit a 182 Queued message to OTT application (B1).

In step (5), OTT application (B1) may use an inter-process communication (IPC) to communicate with native application (X). For example, depending on the operating system (e.g., Android, iOS, etc.), end device 180-1 may include various libraries, layers (e.g., application, native, kernel, etc.), a binder framework, etc., that supports the IPC. As illustrated, OTT application (B1) may request that native application (X) call identity B of the OTT application (B1). The communication may include data that identifies the function to perform (e.g., initiate a call) and the identity B (e.g., a virtual telephone number).

In steps (6)-(9), in response to the IPC, the native application (X) may generate and transmit a SIP INVITE message to TAS 117-3. The SIP INVITE message may include a P-Preferred Identity header (PPID) for identity X and data pertaining to the communication session, such as Session Description Protocol (SDP) data. As illustrated, in step (7), the communication service may be provisioned with the QoS for identity X. In step (8), the SIP INVITE message may be wrapped and/or modified such that the SIP INVITE includes a PAID for identity X. In step (9), TAS 117-3 may receive the SIP INVITE message from native application (X) for identity B of the OTT application (B1).

In steps (10) and (11), TAS 117-3 may determine to provide originating communication services for identity B, and identify that the queued call at step (3) correlates to the incoming call from the native application (X). For example, TAS 117-3 may access and use data stored during the registration process. In step (12), TAS 117-3 may generate and transmit a SIP INVITE to end device 180-3 via IMS device 117-2 of network 115. As illustrated, the SIP INVITE message may include the To: R and From: B, as well as a PAID of B and SDP data (e.g., pertaining to identity X).

Referring to FIG. 3B, in step (13), IMS device 117-2 may forward the SIP INVITE message to end device 180-3. In steps (14)-(22), in response to receiving the SIP INVITE message, typical SIP call flow messages may be transmitted and received, such as ringing, notification, and 200 OK. In step (23), a media session may be established between end device 180-1 and end device 180-3 that is provision with network resources that provide QoS, as described herein.

Referring to FIG. 3C, to complete the signaling responsive to the SIP Offerless INVITE message and the 182 Queued message, in step (24), TAS 117-3 may generate and transmit a 380 Alternative Service message to OTT application (B1). Additionally, in steps (25)-(27), a notify message and a 200 OK message may be exchanged between TAS 117-3 and OTT application (B1). Further, in steps (28) and (29), TAS 117-3 may generate and transmit a notify message to OTT application (B2) to indicate existence of call and use of shared primary identity, and receive a 200 OK message.

Although FIGS. 3A-3C illustrate an exemplary process of the native-based support service for the OTT application, according to other exemplary embodiments, the process may include additional, different, and/or fewer steps. For example, prior to step (5), OTT application (B1) may confirm that native application (X) is registered with network 115. Additionally, for example, an Offerless INVITE may simply be an INVITE (e.g., not an Offerless INVITE).

Figure 4:
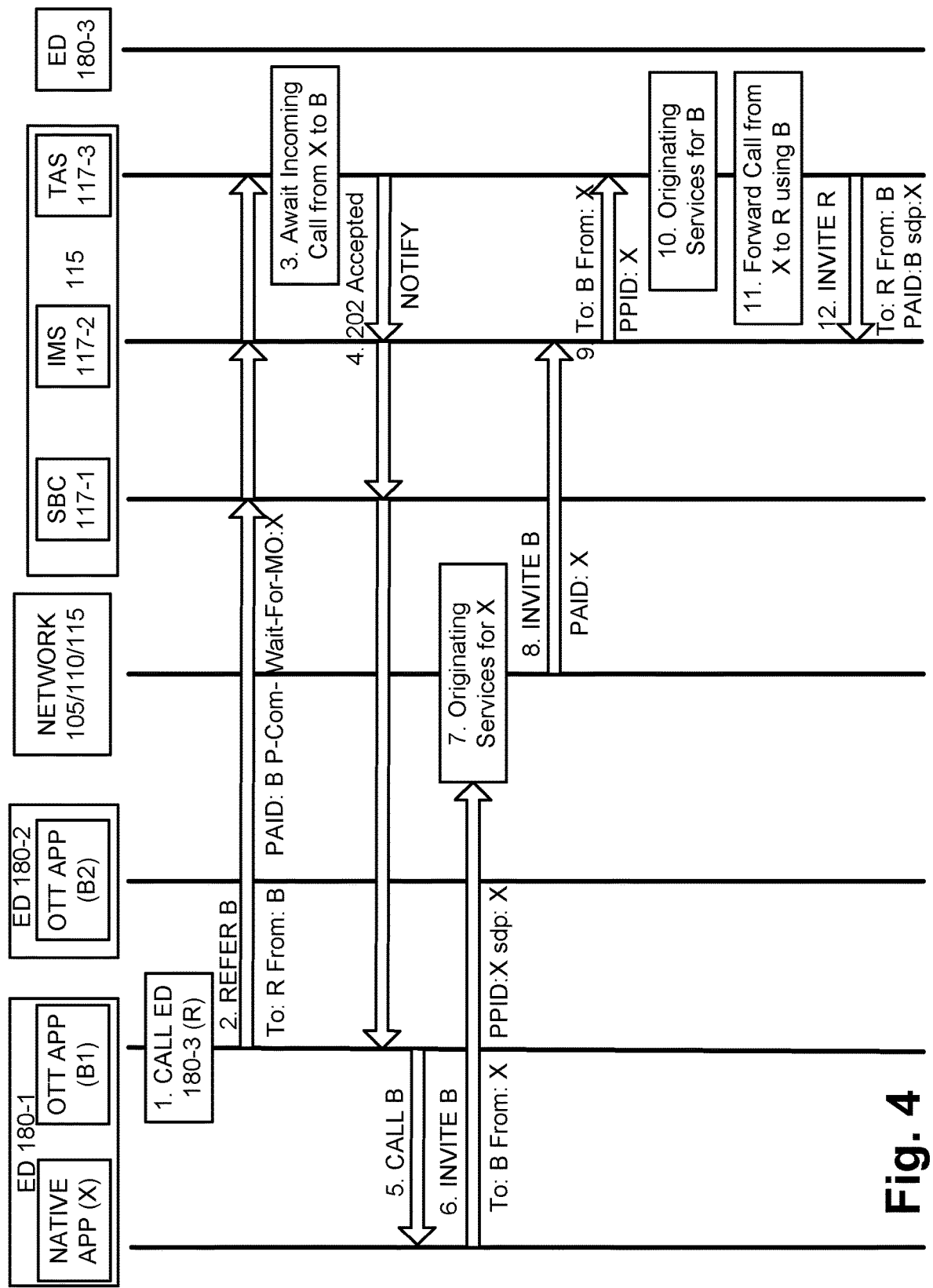
FIG. 4 is a call flow diagram illustrating yet another exemplary process of an exemplary embodiment of the native-based support service for the OTT application.

FIG. 4 is call flow diagram illustrating yet another exemplary process of an exemplary embodiment of the native-based support service for the OTT application. For example, the call flow diagram may provide for a process to initiate a communication session from OTT application (B1) to end device 180-3. According to an exemplary embodiment, the mobile originating call process may use SIP-based messaging. In contrast to the process of FIGS. 3A-3C, in step (2), the OTT application (B1) generates and transmits a SIP Refer message to TAS 117-3 instead of a SIP INVITE message. Additionally, in step (4), responsive to the SIP Refer message, TAS 117-3 generates and transmits a 202 Accepted message to OTT application (B1) instead of a 182 Queued message. While the remaining call flow messaging may be similar to that previously described in relation to FIGS. 3A-3C, for the sake of brevity, FIG. 4 illustrates the exemplary messaging up through step (12).

Figure 5A:
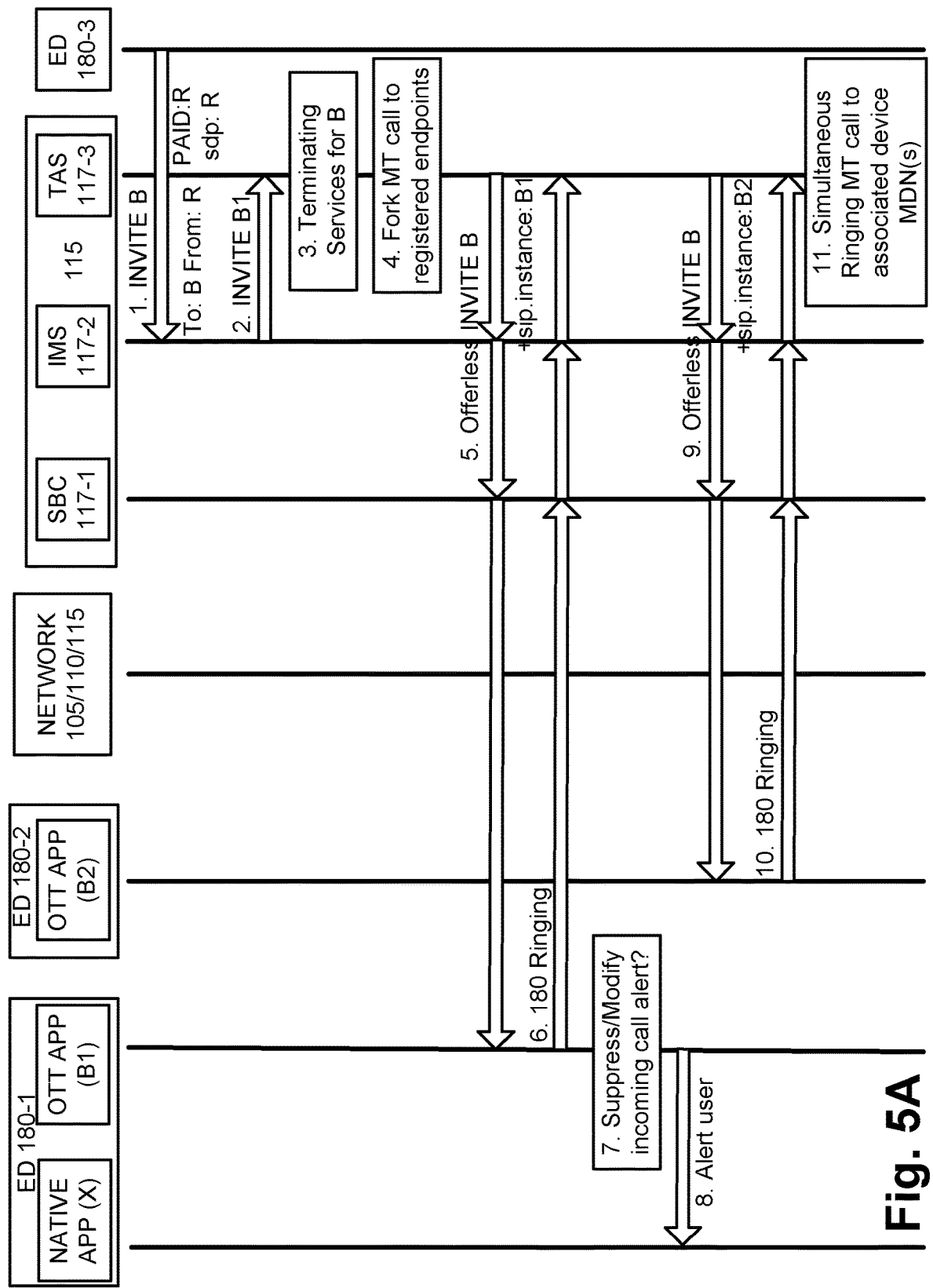
FIGS. 5A-5C are call diagrams illustrating still another exemplary process of an exemplary embodiment of the native-based support service for the OTT application.
Figure 5B:
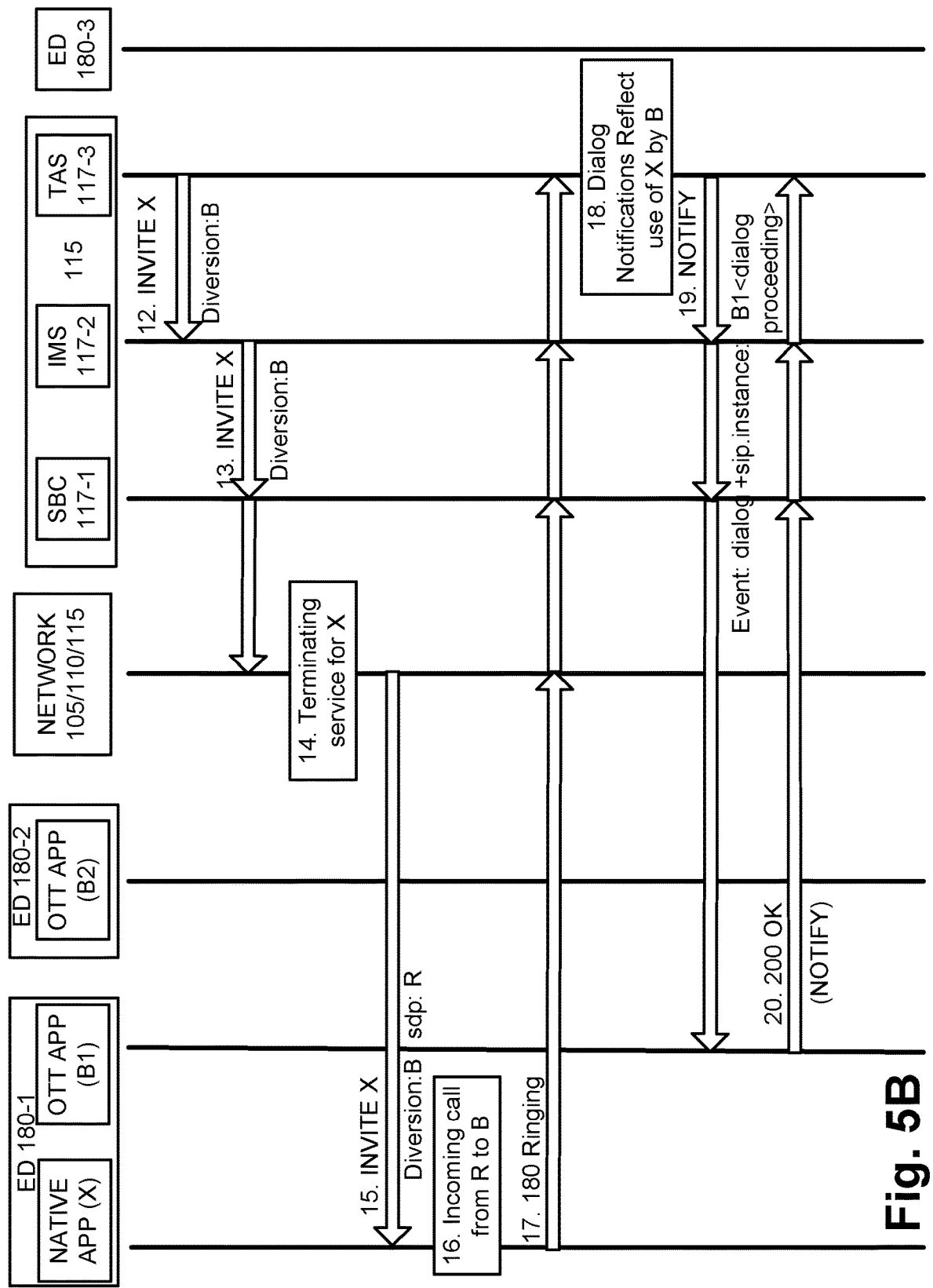
Figure 5C:
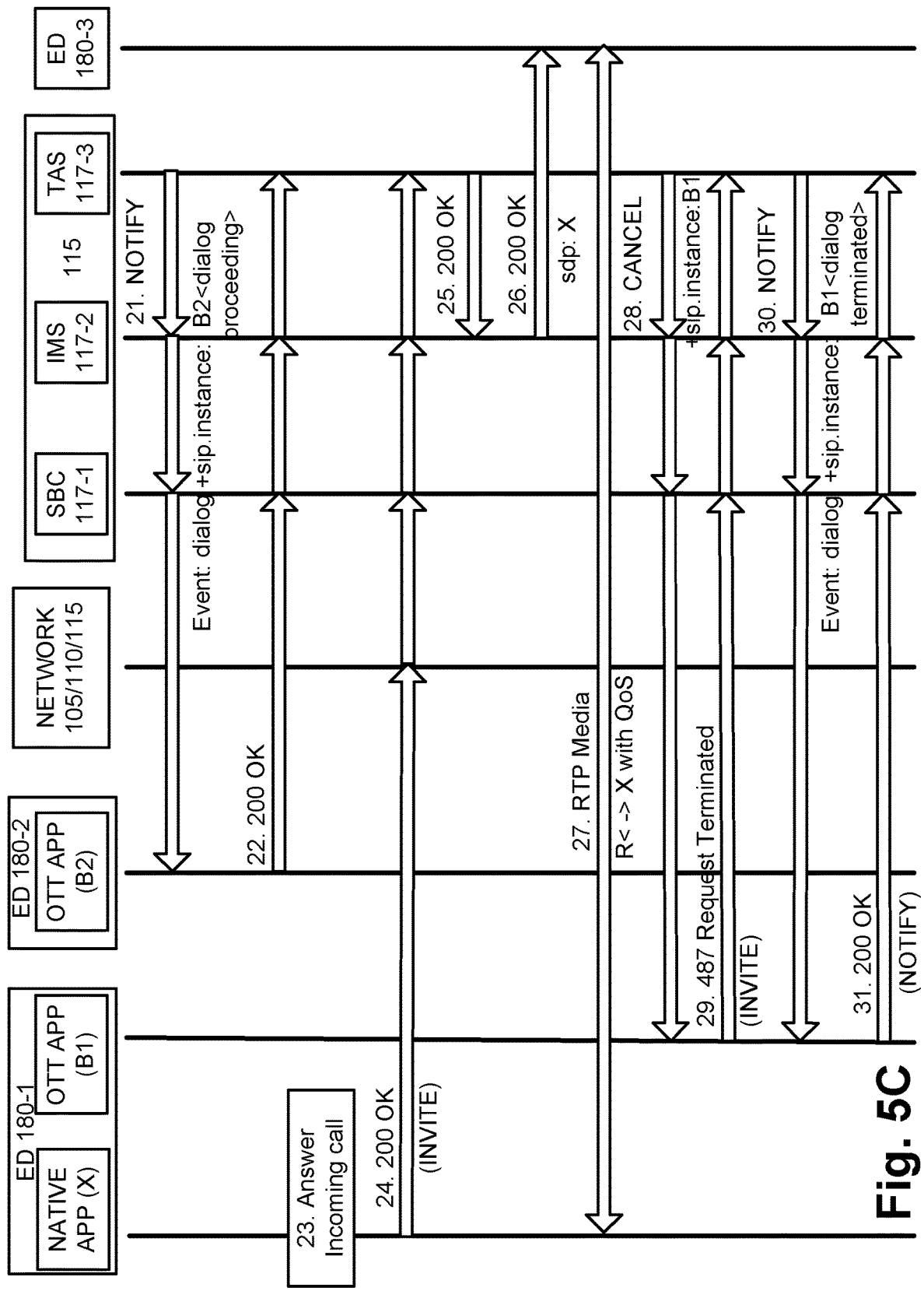

FIGS. 5A-5C are call flow diagrams illustrating still another exemplary process of an exemplary embodiment of the native-based support service for the OTT application. For example, the call flow diagram may provide for a process to initiate a communication session from end device 180-3 to OTT application (B1) (e.g., a mobile terminating (MT) call flow). According to an exemplary embodiment, the mobile terminating call process may use SIP-based messaging. Additionally, while the process of FIGS. 5A-5C may refer to a telephone service, according to other exemplary embodiments, the mobile terminating call process may pertain to communication service different from a telephone service. The number and type of networks are exemplary. It may be assumed that OTT application (B1) and native application (X) are registered and subscribed with a network 115, which may be different or not.

Referring to FIG. 5A, in step (1), IMS device 117-2 of network 115 may receive a SIP INVITE message from end device 180-3 to identity B of the OTT application of end device 180-1. For example, a user of end device 180-3 may initiate a telephone call, and in turn, the SIP INVITE message is generated and transmitted by end device 180-3 to TAS 117-3. The SIP INVITE message may include a PAID header and SDP data. In step (2), IMS device 117-2 may transmit the SIP INVITE message to TAS 117-3. In step (3), based on the reading of the SIP INVITE message, TAS 117-3 may determine to provide terminating services for identity B. In step (4), based on the registration information stored by TAS 117-3, TAS 117-3 may determine to fork the terminating service to all registered endpoints. In steps (5), (6), (9), and (10), TAS 117-3 may generate and transmit Offerless SIP INVITE messages to the OTT applications (B1) and (B2), and may receive 180 Ringing messages. It may be assumed that the OTT application (B2) is also subscribed, and would receive call state information. The Offerless SIP INVITE messages may include a header to indicate not to process the INVITE, but use only for location notification. According to an exemplary implementation, in step (7), the OTT application (B1) may determine whether to alert the user of end device 180-1. For example, the OTT application (B1) may store a user preference pertaining to this function. In step (8), the OTT application (B1) may alert the user via the native application (X) when the user preference is configured to provide such an alert. According to other exemplary implementations, steps (7) and (8) may be omitted, or may result in the user preference indicating to not alert the user. In step (11), TAS 117-3 may receive the 180 Ringing messages indicative of simultaneous ringing for the MT service.

Referring to FIG. 5B, TAS 117-3 may generate and transmit a SIP INVITE message to identity X of end device 180-1. The SIP INVITE message may include a Diversion header indicating the B1 identity. In step (13), IMS device 117-2 transmits the SIP INVITE message a network 115 of native application (X), and in step (14), network 115 provides a MT service for identity X of native application (X). In step (15), a SIP INVITE message to identity X is generated and transmitted in which the SIP INVITE message includes the Diversion header, and SDP data of identity R. In step (16), in response to receiving the SIP INVITE message, the native application (X) determines that there is an incoming call from identity R to identity B. In response, the native application (X) generates and transmits a 180 Ringing message to TAS 117-3.

In response to receiving the 180 Ringing message, in step (18), TAS 117-3 may determine to provide dialog notifications pertaining to the use of identity X by identity B and/or OTT application (B1). For example, in steps (19) and (20), a NOTIFY message and 200 OK message may be exchanged between TAS 117-3 and OTT application (B1). Referring to FIG. 5C, in steps (21) and (22), a similar exchange of messages may be communicated between TAS 117-3 and the OTT application (B2) of end device 180-2. In step (23), assume that the user answers the call at end device 180-1.

According to other exemplary scenarios, the user may answer the call at end device 180-2. In response to answering the call, in step (24), end device 180-1 may generate and transmit a 200 OK message, which pertains to the INVITE message, to TAS 117-3. In steps (25) and (26), the 200 OK message may be communicated to end device 180-2, and in step (27), a communication session may be established between native application (X) of end device 180-1 and end device 180-3, which is supported by the QoS of network 115 (e.g., TAS 117-3, etc.).

In steps (28)-(31), additional signaling may be transmitted and received, such as CANCEL, 487 Request Terminated, NOTIFY, and 200 OK messages between TAS 117-3 and the OTT application (B1). Although not illustrated, similar signaling may be performed between TAS 117-3 and the OTT application (B2).

Although FIGS. 5A-5C illustrate an exemplary process of the native-based support service for the OTT application, according to other exemplary embodiments, the process may include additional, different, and/or fewer steps.

FIG. 6 is a diagram illustrating exemplary components of a device 600 that may be included in one or more of the devices described herein. For example, device 600 may correspond to components included in end device 180, access device 107, and network device 110. As illustrated in FIG. 6, device 600 includes a bus 605, a processor 610, a memory/storage 615 that stores software 620, a communication interface 625, an input 630, and an output 635. According to other embodiments, device 600 may include fewer components, additional components, different components, and/or a different arrangement of components than those illustrated in FIG. 6 and described herein.

Bus 605 includes a path that permits communication among the components of device 600. For example, bus 605 may include a system bus, an address bus, a data bus, and/or a control bus. Bus 605 may also include bus drivers, bus arbiters, bus interfaces, clocks, and so forth.

Processor 610 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 610 may be implemented as hardware (e.g., a microprocessor, etc.), a combination of hardware and software (e.g., a SoC, an ASIC, etc.), may include one or multiple memories (e.g., cache, etc.), etc.

Processor 610 may control the overall operation or a portion of operation(s) performed by device 600. Processor 610 may perform one or multiple operations based on an operating system and/or various applications or computer programs (e.g., software 620). Processor 610 may access instructions from memory/storage 615, from other components of device 600, and/or from a source external to device 600 (e.g., a network, another device, etc.). Processor 610 may perform an operation and/or a process based on various techniques including, for example, multithreading, parallel processing, pipelining, interleaving, etc.

Memory/storage 615 includes one or multiple memories and/or one or multiple other types of storage mediums. For example, memory/storage 615 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 615 may include a hard disk (e.g., a magnetic disk, an optical disk, a magneto-optic disk, a solid state disk, etc.), a Micro-Electromechanical System (MEMS)-based storage medium, and/or a nanotechnology-based storage medium.

Memory/storage 615 may include drives for reading from and writing to the storage medium.

Memory/storage 615 may be external to and/or removable from device 600, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 615 may store data, software, and/or instructions related to the operation of device 600.

Software 620 includes an application or a program that provides a function and/or a process. As an example, with respect to end device 180, software 620 may include an application that, when executed by processor 610, provides a function of the fixed wireless qualification service, as described herein. Additionally, with reference to network device 110, software 620 may include an application that, when executed by processor 610, provides a function of the fixed wireless qualification service, as described herein. Software 620 may also include firmware, middleware, microcode, hardware description language (HDL), and/or other form of instruction. Software 620 may also be virtualized. Software 620 may further include an operating system (OS) (e.g., Windows, Linux, Android, proprietary, etc.).

Communication interface 625 permits device 600 to communicate with other devices, networks, systems, and/or the like. Communication interface 625 includes one or multiple wireless interfaces and/or wired interfaces. For example, communication interface 625 may include one or multiple transmitters and receivers, or transceivers. Communication interface 625 may operate according to a protocol stack and a communication standard. Communication interface 625 may include an antenna. Communication interface 625 may include various processing logic or circuitry (e.g., multiplexing/de-multiplexing, filtering, amplifying, converting, error correction, application programming interface (API), etc.). Communication interface 625 may be implemented as a point-to-point interface, a service based interface, etc.

Input 630 permits an input into device 600. For example, input 630 may include a keyboard, a mouse, a display, a touchscreen, a touchless screen, a button, a switch, an input port, speech recognition logic, and/or some other type of visual, auditory, tactile, etc., input component. Output 635 permits an output from device 600. For example, output 635 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 600 may be implemented in the same manner. For example, device 600 may be instantiated, spun up, spun down, etc., using well-known virtualization techniques in a public/private cloud or other type of network.

Device 600 may perform a process and/or a function, as described herein, in response to processor 610 executing software 620 stored by memory/storage 615. By way of example, instructions may be read into memory/storage 615 from another memory/storage 615 (not shown) or read from another device (not shown) via communication interface 625. The instructions stored by memory/storage 615 cause processor 610 to perform a process described herein. Alternatively, for example, according to other implementations, device 600 performs a process described herein based on the execution of hardware (processor 610, etc.).

Figure 7:
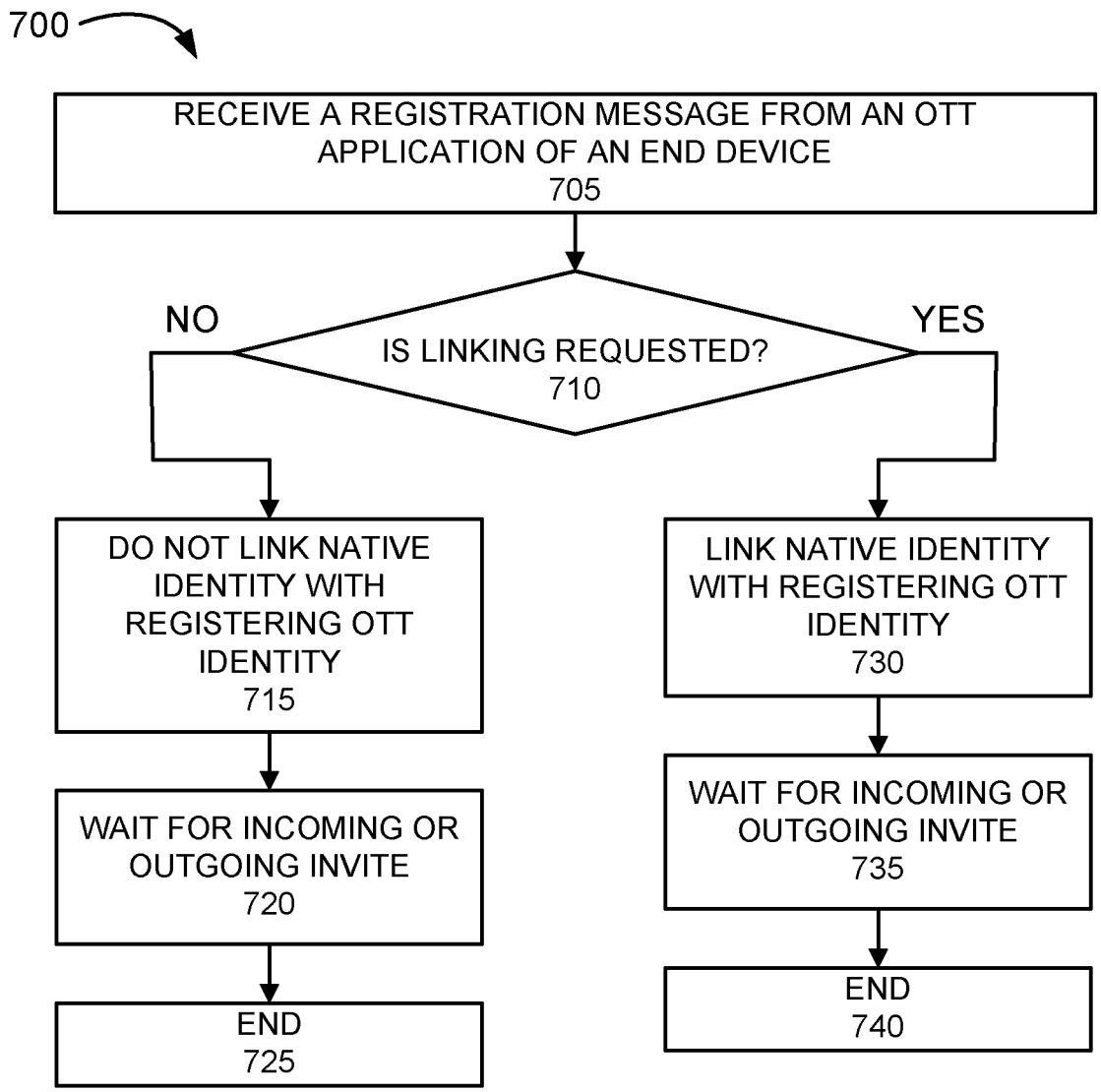
FIGS. 7-12 are flow diagrams illustrating exemplary processes of exemplary embodiments of the native-based support service for the OTT application.

FIG. 7 is a flow diagram illustrating an exemplary process 700 of an exemplary embodiment of the native-based support service for the OTT application. According to an exemplary embodiment, network device 117 of network 115 may perform steps of process 700 during a registration procedure. For example, processor 610 executes software 620 to perform a step illustrated in FIG. 7, as described herein. Additionally, or alternatively, a step illustrated in FIG. 7 may be performed by execution of only hardware. According to an exemplary implementation, network device 117 may be a communication service server (e.g., a TAS, a messaging server, a server for audio/video conferencing, etc.).

Referring to FIG. 7, in block 705, a registration message from an OTT application of an end device may be received. For example, network device 117 may receive a SIP REGISTER message from an OTT application of end device 180-1. End device 180-1 may include a native application pertaining to a communication service and a primary identity, and an OTT application that includes a secondary or virtual identity of the same communication service. A subscription of the communication service supports the linking of the primary and secondary identities, as described herein. According to an exemplary implementation, the SIP REGISTER message includes the +sip.instance parameter and parameter value (e.g., B1), and the parameter P-COM-Host-MDN and the parameter value (e.g., X), as described herein.

In block 710, it may be determined whether linking is requested. For example, in response to receiving the registration message, network device 117 may determine whether the registration message includes data indicating to link the primary identity and the (secondary) identity of the OTT application. Network device 117 may determine whether linking is requested based on the presence or the absence of the parameter and parameter value, as described herein.

When it is determined that linking is not requested (block 710—NO), the native identity is not linked with the registering OTT identity (block 715). For example, when the registration message does not include data indicating to link the identities, network device 117 may register the OTT application without any linking. In block 720, network 117 may wait for an incoming or outgoing SIP INVITE. In block 725, process 700 may end. For example, network device 117 may perform various procedures relating to the establishment, maintenance, and termination of a communication session according to SIP and the communication service.

When it is determined that linking is requested (block 710—YES), the native identity is linked with the registering OTT identity (block 730). For example, when the registration message does include data indicating to link the identities, network device 117 may register the OTT application and link the OTT identity to primary identity of the native application of end device 180-1. For example, network device 117 may store data that indicates a correlation between the OTT identity and the native identity. In block 735, network 117 may wait for an incoming or outgoing SIP INVITE. In block 740, process 700 may end.

Although FIG. 7 illustrates an exemplary process 700 of the native-based support service for the OTT application, according to other embodiments, process 700 may include additional operations, fewer operations, and/or different operations than those illustrated in FIG. 7, and described herein.

Figure 8:
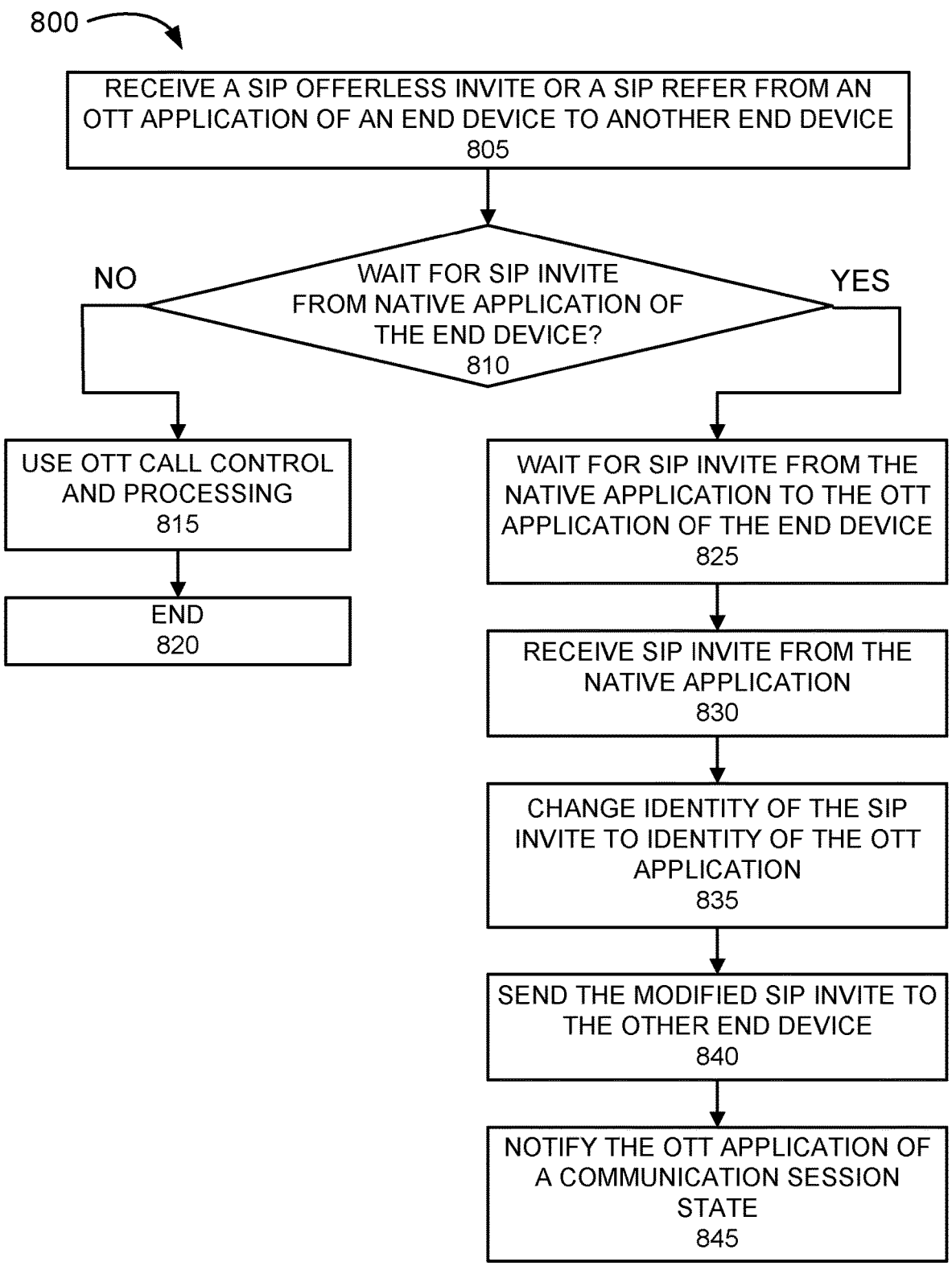

FIG. 8 is a flow diagram illustrating another exemplary process 800 of an exemplary embodiment of the native-based support service for the OTT application. According to an exemplary embodiment, network device 117 of network 115 may perform steps of process 800 during a MO procedure for a communication service. For example, processor 610 executes software 620 to perform a step illustrated in FIG. 8, as described herein. Additionally, or alternatively, a step illustrated in FIG. 8 may be performed by execution of only hardware. According to an exemplary implementation, network device 117 may be a communication service server (e.g., a TAS, a messaging server, a server for audio/video conferencing, etc.).

Referring to FIG. 8, in block 805, a SIP Offerless INVITE or a SIP REFER message from an OTT application of an end device may be received. For example, network device 117 may receive the SIP Offerless INVITE or the SIP REFER message from OTT application (B1) of end device 180-1. The SIP Offerless INVITE or the SIP REFER message may include data indicating to network device 117 to wait for an incoming call from native application (X). According to an exemplary implementation, the data may include parameters and parameter values, as described herein. Additionally, the SIP Offerless INVITE or the SIP REFER message may include a PAID for an identity of the OTT application (e.g., B).

In block 810, it may be determined whether to wait for a SIP INVITE from the native application of the end device. For example, network device 117 may read the received SIP Offerless INVITE or the SIP REFER message, and determine whether the message includes the data indicating to wait.

When it is determined to not wait for the SIP INVITE from the native application (block 810—NO), OTT call control and processing may be used (block 815). For example, network device 117 may not wait for the SIP INVITE from the native application of the end device, and apply OTT call control and processing with reference to the received SIP Offerless INVITE or the received SIP REFER message. In block 820, process 800 may end.

When it is determined to wait for the SIP INVITE from the native application (block 810—YES), waiting for the SIP INVITE may be performed (block 825). For example, network device 117 may wait to receive the SIP INVITE from identity X, as indicated in the data. Network device 117 may wait for a time period within a defined timeout.

In block 830, a SIP INVITE from the native application may be received. For example, network device 117 may receive the SIP INVITE from the native application (X) of end device 180-1 and a (primary) identity X. It may be assumed that the SIP INVITE was received within the allowed configured time period.

In block 835, an identity associated with the SIP INVITE may be changed to an identity of the OTT application. For example, network device 117 may change a From field of the SIP INVITE from identity X to identity B used by the OTT application (B1). Additionally, network device 117 may change a PAID for identity X to a PAID for identity B.

In block 840, a modified SIP INVITE may be transmitted to another end device. For example, network device 117 may transmit the modified SIP INVITE to another end device to which the received SIP INVITE or the SIP REFER message of block 805 was directed.

In block 845, a state of a communication session may be communicated to the OTT application. For example, network device 117 may generate and transmit a SIP NOTIFY message to the OTT application (B1) to indicate use of identity X by identity B and/or the OTT application (B1).

Although FIG. 8 illustrates an exemplary process 800 of the native-based support service for the OTT application, according to other embodiments, process 800 may include additional operations, fewer operations, and/or different operations than those illustrated in FIG. 8, and described herein. For example, as previously described, a SIP INVITE may be used instead of the SIP Offerless INVITE or the SIP REFER.

Figure 9:
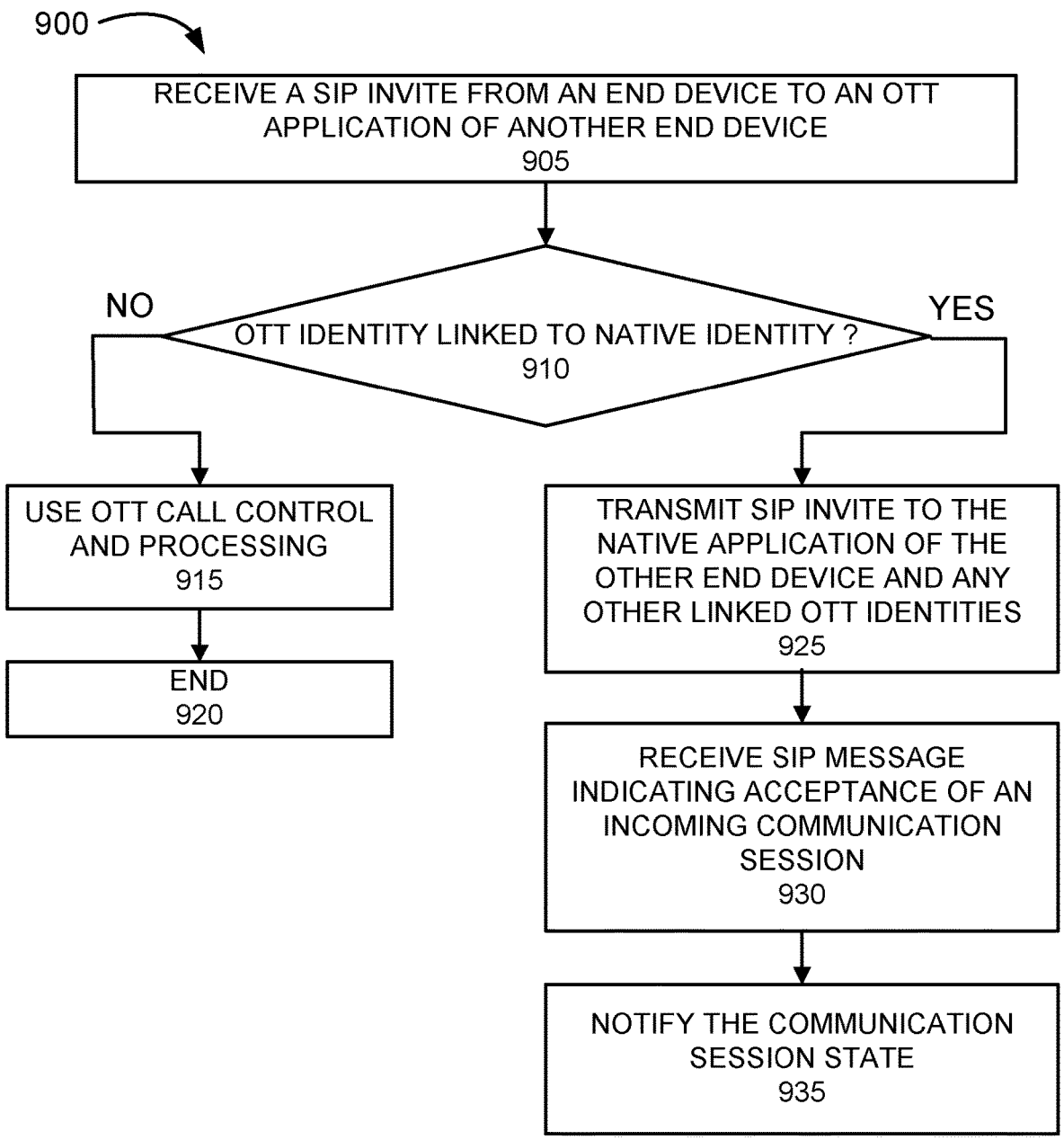

FIG. 9 is a flow diagram illustrating yet another exemplary process 900 of an exemplary embodiment of the native-based support service for the OTT application. According to an exemplary embodiment, network device 117 of network 115 may perform steps of process 900 during a MT procedure for a communication service. For example, processor 610 executes software 620 to perform a step illustrated in FIG. 9, as described herein. Additionally, or alternatively, a step illustrated in FIG. 9 may be performed by execution of only hardware. According to an exemplary implementation, network device 117 may be a communication service server (e.g., a TAS, a messaging server, a server for audio/video conferencing, etc.).

Referring to FIG. 9, in block 905, a SIP INVITE from an end device to an OTT application of another end device. For example, network device 117 may receive a SIP INVITE from end device 180-3 to an OTT application (B1) of end device 180-1.

In block 910, it may be determined whether the OTT identity is linked to a native identity. For example, network device 117 may determine whether the identity B associated with the OTT application (B1) is linked to the native identity associated with a native application (X) of end device 180-1. Network device 117 may store linking data based on a registration procedure or other types of procedures (e.g., subscription information during attachment, etc.). Network device 117 may access the linking data (e.g., B→B1→X) and determine whether the linking data indicates that the OTT identity is correlated to or linked to the native identity.

When it is determined that the OTT identity is not linked to the native identity (block 910—NO), OTT call control and processing may be used (block 915). For example, network device 117 may apply OTT call control and processing with reference to the received SIP INVITE and a MT terminating service. In block 920, process 900 may end.

When it is determined that the OTT identity is linked to the native identity (block 910—YES), the SIP INVITE may be transmitted to the native application of the other end device and any other linked OTT identities (block 925). For example, network device 117 may transmit a SIP INVITE to identity X of the native application (X) of end device 180-1. The SIP INVITE may include a Diversion header for the OTT identity (e.g., B). Additionally, for example, network device 117 may transmit an Offerless INVITE to the OTT application B1 and any other end devices (e.g., end device 180-2, etc.) that are linked to identity B. The Offerless INVITE may include a header indicating that the message be used only for local notification of an incoming call.

In block 930, a SIP message may be received indicating acceptance of the incoming communication session. For example, network device 117 may receive a 200 OK message, in relation to the SIP INVITE, from end device 180-1 or other end devices (e.g., end device 180-2 associated with a linked OTT identity, etc.).

In block 935, the communication session state may be provided. For example, network device 117 may generate and transmit a SIP CANCEL message, with reference to the SIP INVITE, to the OTT application B1 and any other linked OTT identity.

Although FIG. 9 illustrates an exemplary process 900 of the native-based support service for the OTT application, according to other embodiments, process 900 may include additional operations, fewer operations, and/or different operations than those illustrated in FIG. 9, and described herein. For example, network device 117 may receive various 180 Ringing messages, transmit NOTIFY messages, etc., during the MT procedure, as well as perform additional functions and messaging relating to the establishment, maintenance, and termination of the communication session.

Figure 10:
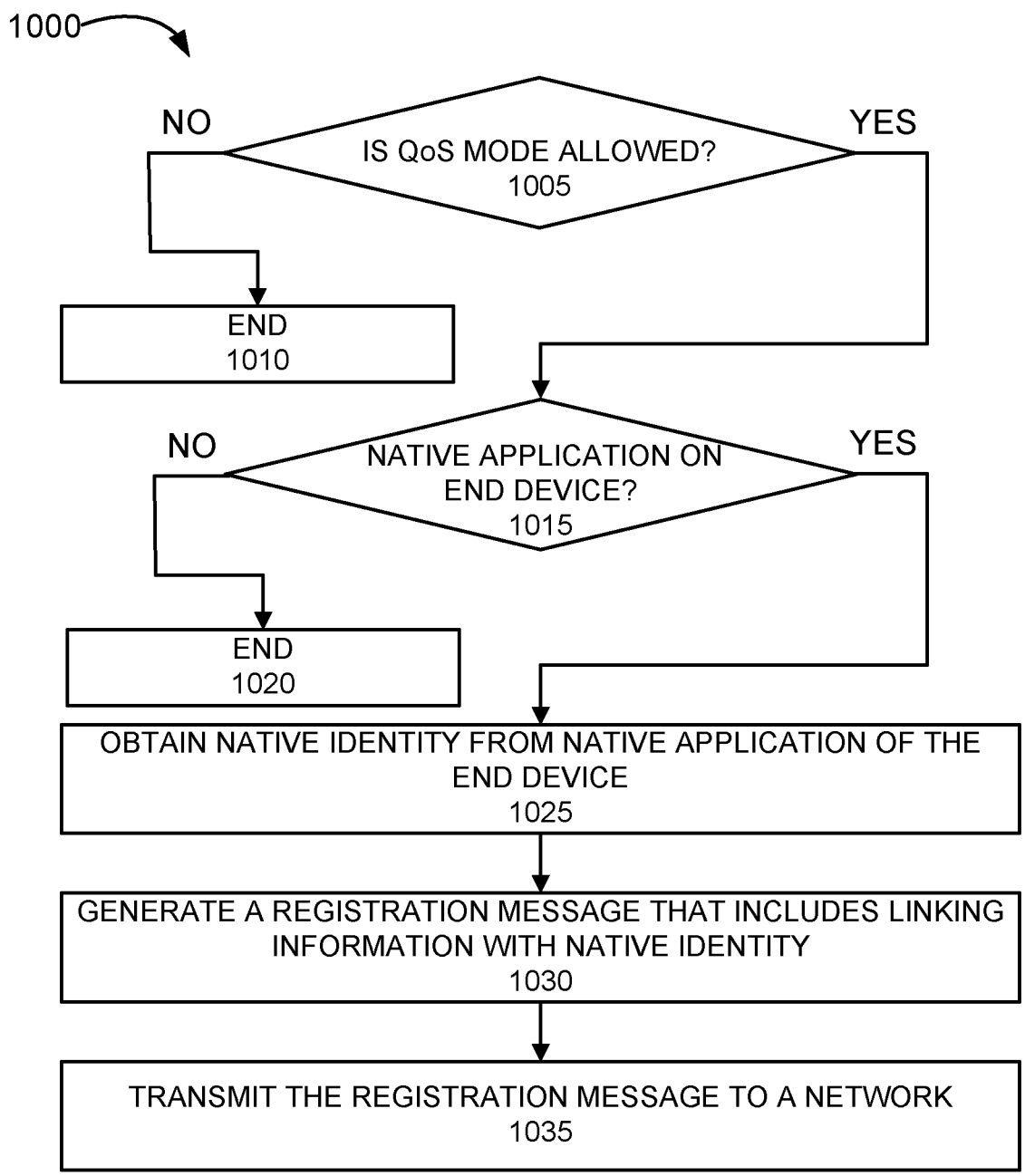

FIG. 10 is a flow diagram illustrating still another exemplary process 1000 of an exemplary embodiment of the native-based support service for the OTT application. According to an exemplary embodiment, an OTT application of end device 180-1 performs steps of process 1000 during a registration procedure. For example, processor 610 executes software 620 to perform a step illustrated in FIG. 10, as described herein. Additionally, or alternatively, a step illustrated in FIG. 10 may be performed by execution of only hardware. According to some exemplary embodiments, the registration procedure may be executed as a part of an attachment procedure between end device 180-1 and network 115. For example, this may occur automatically subsequent to the booting-up of end device 180-1. According to other exemplary embodiments, the registration procedure may be executed in response to a user input being received by the OTT application.

Referring to FIG. 10, in block 1005, it may be determined whether a QoS mode is allowed. For example, the OTT application of end device 180-1 may determine whether a user preference indicates whether the native-based support service is enable or disabled. Additionally, or alternatively, the OTT application of end device 180-1 may not invoke the native-based support service when cellular wireless service is not available and/or other contextual conditions exist (e.g., airplane mode activated, currently poor cellular wireless coverage), as previously described.

When it is determined that the QoS mode is not allowed (block 1005—NO), process 1000 may end (block 1010). For example, end device 180-1 may not use the native-based support service, and execute an OTT registration procedure.

When it is determined that the QOS mode is allowed (block 1005—YES), it may be determined whether an end device includes a native application (block 1015). For example, the OTT application may determine whether end device 180-1 includes a native dialer/native application for a same communication service (e.g., telephone, messaging, video conferencing, etc.) as the OTT application. The OTT application may communicate with the operating system of end device 180-1 to make such a determination.

When it is determined that the end device does not include the native application (block 1015—NO), process 1000 may end (block 1020). For example, end device 180-1 may not use the native-based support service, and execute an OTT registration procedure.

When it is determined that the end device does include the native application (block 1015—YES), the native identity may be obtained from the native application of the end device (block 1025). For example, the OTT application may perform an IPC procedure to obtain the native identity (e.g., identity X).

In block 1030, a registration message that includes linking information with the native identity may be generated. For example, the OTT application may generate a SIP REGISTER message that includes the linking information. For example, according to an exemplary implementation, the SIP REGISTER message may include a parameter (e.g., +sip.instance) and a parameter value (e.g., B1), and a parameter (e.g., P-COM-Host-MDN) and a parameter value (e.g., X) to provide a link between the identity B of the OTT application (B1) and the identity X, and the corresponding QoS for provisioning the communication service. According to other exemplary implementations, the format and syntax of the parameter value may be different.

In block 1035, the registration message may be transmitted to a network. For example, the OTT application may transmit the registration message to network 115 that provides the native-based support service for the OTT application.

Although FIG. 10 illustrates an exemplary process 1000 of the native-based support service for the OTT application, according to other embodiments, process 1000 may include additional operations, fewer operations, and/or different operations than those illustrated in FIG. 10, and described herein. For example, according to some exemplary embodiments, block 1015 may be omitted. Additionally, or alternatively, the OTT application may generate and transmit a SIP SUBSCRIBE message to network 115, wait for incoming or outgoing calls, etc., as described herein.

Figure 11:
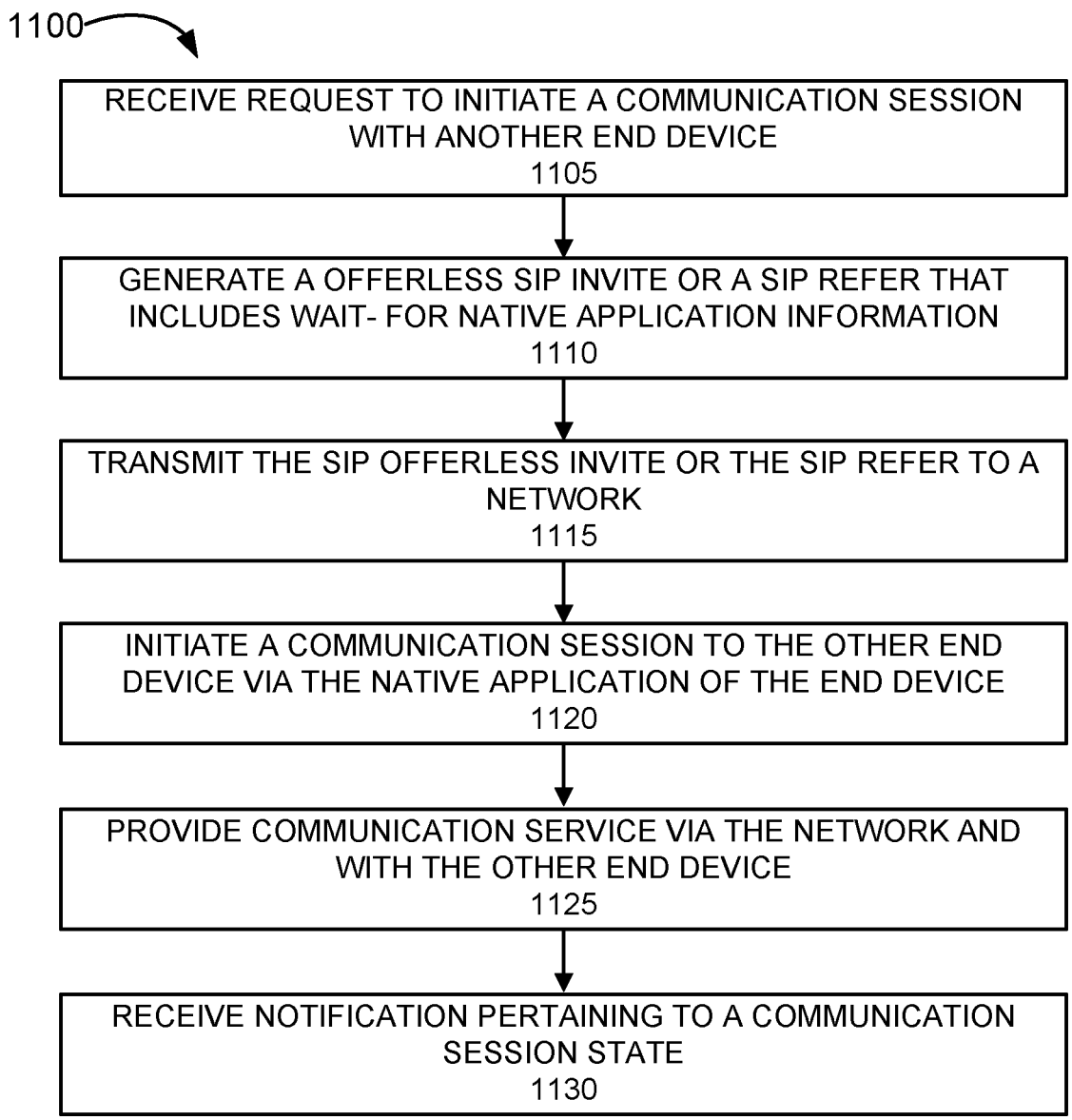

FIG. 11 is a flow diagram illustrating still another exemplary process 1100 of an exemplary embodiment of the native-based support service for the OTT application. According to an exemplary embodiment, the OTT application of end device 180-1 performs steps of process 1100 during an MO procedure for a communication service. For example, processor 610 executes software 620 to perform a step illustrated in FIG. 11, as described herein. Additionally, or alternatively, a step illustrated in FIG. 11 may be performed by execution of only hardware.

Referring to FIG. 11, in block 1105, a request to initiate a communication session with another end device may be received. For example, a user of end device 180-1 may provide an input to initiate a communication session with end device 180-3. In block 1110, a SIP Offerless INVITE or a SIP REFER message, which includes wait-for native application information, may be generated. For example, the OTT application may generate the SIP Offerless INVITE or the SIP REFER that includes a PAID header for an identity of the OTT application (e.g., B1), and the parameter and parameter value P-Com-Wait-For-MO: X. According to other exemplary implementations, the parameter and the parameter value may be of a different format/syntax.

In block 1115, the SIP Offerless Invite or the SIP REFER message may be transmitted. For example, the OTT application may transmit the SIP Offerless Invite or the SIP REFER message to network 115 that provides the native-based support service, as described herein.

In block 1120, a communication session may be initiated to the other end device via a native application of the end device. For example, based on IPC, the OTT application (B1) may request that the native application (X) of end device 180-1 call the OTT identity (B) of the OTT application (B1).

In block 1125, a communication service may be provided via the network and with the other end device. For example, the OTT application may provide a telephone service or another type of service responsive to the other end device accepting the communication session request.

In block 1130, a notification may be received pertaining to a communication session state. For example, the OTT application may receive various SIP NOTIFY messages indicating the communication session state (e.g., communication session ending, etc.).

Although FIG. 11 illustrates an exemplary process 1100 of the native-based support service for the OTT application, according to other embodiments, process 1100 may include additional operations, fewer operations, and/or different operations than those illustrated in FIG. 11, and described herein. For example, in block 1110, a SIP INVITE may be generated.

Figure 12:
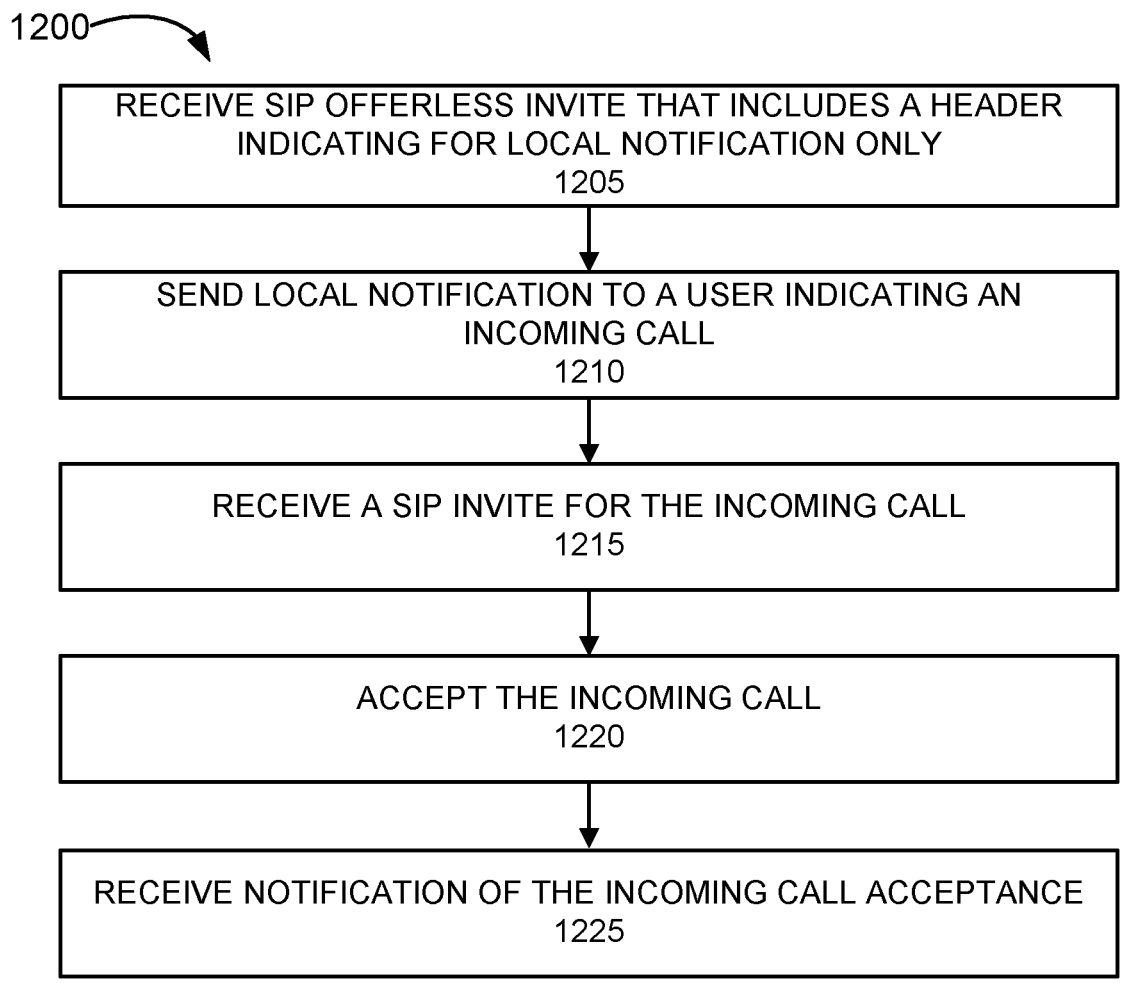

FIG. 12 is a flow diagram illustrating still another exemplary process 1200 of an exemplary embodiment of the native-based support service for the OTT application. According to an exemplary embodiment, end device 180-1 performs steps of process 1200 during an MT procedure for a communication service. For example, processor 610 executes software 620 to perform a step illustrated in FIG. 12, as described herein. Additionally, or alternatively, a step illustrated in FIG. 12 may be performed by execution of only hardware.

Referring to FIG. 12, in block 1205, a SIP Offerless INVITE message that includes data indicating for local notification only may be received. For example, the OTT application of end device 180-1 may receive the SIP Offerless INVITE message from network 115 that provides the native-bases support service. The SIP Offerless INVITE may include a header or a parameter and parameter value indicating for notification only (e.g., not a normal incoming call, etc.).

In block 1210, a local notification indicating an incoming call to a user may be sent. For example, the OTT application may notify a user of end device 180-1 via the native application that an incoming call has been received from end device 180-3.

In block 1215, a SIP INVITE message is received. For example, the native application of end device 180-1 may receive the SIP INVITE message from its terminating network 115. The SIP INVITE message may indicate an incoming call from another end device (e.g., end device 180-3). The SIP INVITE message may include a Diversion header indicating the identity (e.g., B) used by the OTT application (B1), and SDP data pertaining to the calling end device 180-3.

In block 1220, the incoming call may be accepted. For example, the user may accept the call via the native application. The communication session may be supported by the QoS of network 115, as described herein. In block 1225, a notification of the incoming call acceptance may be received. For example, the OTT application may receive a SIP CANCEL message pertaining to the SIP Offerless INVITE from network 115 that provides the native-based support service.

Although FIG. 12 illustrates an exemplary process 1200 of the native-based support service for the OTT application, according to other embodiments, process 1200 may include additional operations, fewer operations, and/or different operations than those illustrated in FIG. 12, and described herein. For example, in block 1210, as previously described, the OTT application may determine whether to notify the user based on a user preference, etc. Additionally, or alternatively, the OTT application may receive other types of SIP messages pertaining to the establishment, maintenance, or termination of the communication session. Additionally, for example, process 1200 may use a SIP INVITE instead of a SIP Offerless INVITE.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 7-12, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 610, etc.), or a combination of hardware and software (e.g., software 620).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 610) of a device. A non-transitory storage medium includes one or more of the storage mediums described in relation to memory/storage 615.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
receiving, by a network device of a network and from an over-the-top (OTT) application of an end device, a Session Initiation Protocol (SIP) REGISTER indicating to link a second identity to a first identity based on an identifier of the OTT application, and that the second identity is to be provided a quality of service afforded by the first identity for a communication service, and wherein the network device is an application server that provides the communication service;
storing, by the network device in response to receiving the SIP REGISTER, first data indicating that the first identity and the second identity are linked;
receiving, by the network device from the OTT application of the end device after receiving the SIP REGISTER, a Session Initiation Protocol (SIP) Offerless INVITE, a SIP REFER, or a SIP INVITE that includes data indicating to wait for an incoming communication from a native application of the end device;
waiting, by the network device in response to the receiving of the SIP Offerless INVITE, the SIP REFER, or the SIP INVITE, for a SIP INVITE from the native application of the end device;
receiving, by the network device and from the native application of the end device, the SIP INVITE;

changing, by the network device in response to the receiving of the SIP INVITE from the native application, to the first identity of the native application associated with the communication service, which is included in the SIP INVITE from the native application, to the second identity of the OTT application associated with the communication service, wherein the first identity is different from the second identity;

transmitting, by the network device in response to the changing, a modified SIP INVITE to another end device to which the modified SIP INVITE is destined; and establishing, by the network device subsequent to the transmitting, a communication session between the end device and the other end device and pertaining to the communication service, and wherein the establishing further comprises:

using, by the network device, the first data as a basis to provide the quality of service for the communication session.

2. The method of claim 1, wherein the communication service is a telephone service.

3. The method of claim 1, wherein the first identity is a primary telephone number of a shared telephone service, and the second identity is a virtual telephone number of the shared telephone service.

4. The method of claim 1, wherein the SIP INVITE from the native application is received within an allowed configured time period.

5. The method of claim 1, further comprising:
generating, by the network device in response to receiving the SIP Offerless INVITE, a SIP 182 Queued message; and
transmitting, by the network device and to the OTT application of the end device, the SIP 182 Queued message.

6. The method of claim 1, wherein the network includes a Voice over Long Term Evolution (VoLTE) network or an Internet Protocol Multimedia Subsystem (IMS) network.

7. The method of claim 1, further comprising:
generating, by the network device in response to receiving the SIP REFER, a SIP 202 Accepted message; and
transmitting, by the network device and to the OTT application of the end device, the SIP 202 Accepted message.

8. The method of claim 1, wherein the changing further comprises:
changing, by the network device in response to the receiving of the SIP INVITE after receiving the SIP REGISTER, a From field indicating the first identity to a From field indicating the second identity, and a corresponding change to a P-Asserted identity.

9. A network device comprising:
a communication interface;
a memory, wherein the memory stores instructions; and
a processor, wherein the processor executes the instructions to:
receive, via the communication interface and from an over-the-top (OTT) application of an end device, a Session Initiation Protocol (SIP) REGISTER indicating to link a second identity to a first identity based on an identifier of the OTT application, and that the second identity is to be provided a quality of service afforded by the first identity for a communication service, and wherein the network device is an application server that provides the communication service;

store, in response to the receipt of the SIP REGISTER, first data indicating that the first identity and the second identity are linked;
receive, via the communication interface, from the OTT application of the end device after the receipt of the SIP REGISTER, a Session Initiation Protocol (SIP) Offerless INVITE, a SIP REFER, or a SIP INVITE that includes data indicating to wait for an incoming communication from a native application of the end device;
wait, in response to the receipt of the SIP Offerless INVITE, the SIP REFER, or the SIP INVITE, for a SIP INVITE from the native application of the end device;
receive, via the communication interface, from the native application of the end device, the SIP INVITE;
change, in response to the receipt of the SIP INVITE from the native application, the first identity of the native application associated with the communication service, which is included in the SIP INVITE from the native application, to the second identity of the OTT application associated with the communication service, wherein the first identity is different from the second identity;
transmit, via the communication interface, in response to the change, a modified SIP INVITE to another end device to which the SIP INVITE is destined; and
establish, subsequent to the transmission, a communication session between the end device and the other end device and pertaining to the communication service, wherein the first data is used as a basis to provide the quality of service for the communication session.

10. The network device of claim 9, wherein the communication service is a telephone service.

11. The network device of claim 9, wherein the first identity is a primary telephone number of a shared telephone service, and the second identity is a virtual telephone number of the shared telephone service.

12. The network device of claim 9, wherein the SIP INVITE from the native application is received within an allowed configured time period.

13. The network device of claim 9, wherein the processor further executes the instructions to:
generate, in response to receipt of the SIP Offerless INVITE, a SIP 182 Queued message; and
transmit, via the communication interface and to the OTT application of the end device, the SIP 182 Queued message.

14. The network device of claim 9, wherein the network includes a Voice over Long Term Evolution (VoLTE) network or an Internet Protocol Multimedia Subsystem (IMS) network.

15. The network device of claim 9, wherein the processor further executes the instructions to:
generate, in response to the receipt of the SIP REFER, a SIP 202 Accepted message; and
transmit, via the communication interface and to the OTT application of the end device, the SIP 202 Accepted message.

16. The network device of claim 9, wherein, when changing, the processor further executes the instructions to:
change, in response to the receipt of the SIP INVITE after the receipt of the SIP REGISTER, a From field indicating the first identity to a From field indicating the second identity.

17. A non-transitory computer-readable storage medium storing instructions executable by a processor of a network device of a network, which when executed cause the network device to:
- receive, from an over-the-top (OTT) application of an end device, a Session Initiation Protocol (SIP) REGISTER indicating to link a second identity to a first identity based on an identifier of the OTT application, and that the second identity is to be provided a quality of service afforded by the first identity for a communication service, and wherein the network device is an application server that provides the communication service;
- store, in response to the receipt of the SIP REGISTER, first data indicating that the first identity and the second identity are linked;
- receive from the OTT application of the end device after the receipt of the SIP REGISTER, a Session Initiation Protocol (SIP) Offerless INVITE, a SIP REFER, or a SIP INVITE that includes data indicating to wait for an incoming communication from a native application of the end device;
- wait, in response to the receipt of the SIP Offerless INVITE, the SIP REFER, or the SIP INVITE, for a SIP INVITE from the native application of the end device;
- receive from the native application of the end device, the SIP INVITE;
- change, in response to the receipt of the SIP INVITE from the native application, the first identity of the native application associated with the communication service, which is included in the SIP INVITE from the native application, to the second identity of the OTT application associated with the communication service, wherein the first identity is different from the second identity;
- transmit, in response to the change, a modified SIP INVITE to another end device to which the SIP INVITE is destined; and
- establish, subsequent to the transmission, a communication session between the end device and the other end device and pertaining to the communication service, wherein the first data is used as a basis to provide the quality of service for the communication session.

18. The non-transitory computer-readable storage medium of claim 17, wherein the communication service is a telephone service.

19. The non-transitory computer-readable storage medium of claim 17, wherein the first identity is a primary telephone number of a shared telephone service, and the second identity is a virtual telephone number of the shared telephone service.

20. The non-transitory computer-readable storage medium of claim 17, wherein the SIP INVITE from the native application is received within an allowed configured time period.

* * * * *